United States Patent
Wei et al.

(10) Patent No.: US 12,402,061 B2
(45) Date of Patent: Aug. 26, 2025

(54) METHODS, INFRASTRUCTURE EQUIPMENT AND WIRELESS COMMUNICATIONS NETWORKS

(71) Applicant: Sony Group Corporation, Tokyo (JP)

(72) Inventors: Yuxin Wei, Stuttgart (DE); Vivek Sharma, Stuttgart (DE); Hideji Wakabayashi, Stuttgart (DE); Yassin Aden Awad, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 594 days.

(21) Appl. No.: 17/785,061

(22) PCT Filed: Dec. 31, 2020

(86) PCT No.: PCT/EP2020/088074
§ 371 (c)(1),
(2) Date: Jun. 14, 2022

(87) PCT Pub. No.: WO2021/140055
PCT Pub. Date: Jul. 15, 2021

(65) Prior Publication Data
US 2023/0012327 A1    Jan. 12, 2023

(30) Foreign Application Priority Data
Jan. 10, 2020  (EP) ..................... 20151243

(51) Int. Cl.
*H04W 40/24*    (2009.01)
*H04W 40/12*    (2009.01)
*H04W 88/08*    (2009.01)

(52) U.S. Cl.
CPC ......... *H04W 40/246* (2013.01); *H04W 40/12* (2013.01); *H04W 88/08* (2013.01)

(58) Field of Classification Search
CPC ... H04W 40/246; H04W 40/02; H04W 40/12; H04W 88/085; H04W 92/20;
(Continued)

(56) References Cited

U.S. PATENT DOCUMENTS

| 12,015,974 B2 * | 6/2024 | Bao ....................... H04W 48/16 |
| 2006/0098608 A1 * | 5/2006 | Joshi ..................... H04W 40/24 370/225 |

(Continued)

FOREIGN PATENT DOCUMENTS

| CN | 101116352 B | * | 2/2011 | ......... H04L 12/2422 |
| CN | 108934084 A | * | 12/2018 | ......... H04L 12/4633 |

(Continued)

OTHER PUBLICATIONS

International Search Report and Written Opinion mailed on Feb. 19, 2021, received for PCT Application PCT/EP2020/088074, filed on Dec. 31, 2020, 12 pages.

(Continued)

*Primary Examiner* — David Q Nguyen
(74) *Attorney, Agent, or Firm* — XSENSUS, LLP

(57) ABSTRACT

A method for determining a route in an Integrated Access Backhaul "IAB" mesh zone. The method comprises transmitting, to each IAB node of a plurality of IAB nodes, one or more discovery parameters for each IAB node; determining one or more route selection parameters for each IAB node to select a route; a first IAB node of the plurality of IAB nodes determining, based on the one or more discovery parameters, that a second IAB node of the plurality of IAB nodes is discoverable; and upon receiving a packet, selecting a route from the first IAB node based on the one or more route selection parameters and on the first IAB node determining that the second IAB node is discoverable.

18 Claims, 11 Drawing Sheets

(58) Field of Classification Search
CPC ... H04W 84/047; H04W 88/08; H04W 24/02; Y02D 30/70
USPC .............................. 370/328, 329, 330, 225
See application file for complete search history.

(56) References Cited

U.S. PATENT DOCUMENTS

| | | | |
|---|---|---|---|
| 2014/0192715 A1* | 7/2014 | Tickoo | H04W 40/18 370/328 |
| 2022/0015176 A1* | 1/2022 | Ishii | H04W 76/19 |
| 2022/0029694 A1* | 1/2022 | Ishii | H04W 48/12 |
| 2022/0030514 A1* | 1/2022 | Wu | H04W 40/12 |
| 2022/0132388 A1* | 4/2022 | Ishii | H04W 76/19 |

FOREIGN PATENT DOCUMENTS

| | | |
|---|---|---|
| WO | 2019/243137 A1 | 12/2019 |
| WO | 2019/245547 A1 | 12/2019 |

OTHER PUBLICATIONS

Holma et al., "LTE for UMTS OFDMA and SC-FDMA Based Radio Access", John Wiley & Sons, 2009, 232 pages.

Huawei et al., "Revised work item proposal: Enhancements of NB-IoT", 3GPP TSG RAN Meeting #73, RP-161901, Sep. 19-22, 2016, pp. 1-7.

AT&T et al., "New SID Proposal: Study on Integrated Access and Backhaul for NR", 8881123GPP TSG RAN Meeting #75, RP-170821, Mar. 6-9, 2017, pp. 1-5.

3GPP, "NR; Study on Integrated Access and Backhaul; (Release 16)" 3GPP TR 38.874 V16.0.0, Dec. 2018, pp. 1-111.

Qualcomm et al., "Proposals on IAB Architecture", 3GPP TSG-RAN WG2 NR Ad hoc 1801, R2-1801606, Jan. 22-26, 2018, 7 pages.

Qualcomm et al., "Way Forward—IAB Architecture for L2/3 relaying", 3GPP TSG-RAN WG3 Meeting #99, R3-181502, Jan. 26-Mar. 2, 2018, 6 pages.

\* cited by examiner

METHODS, INFRASTRUCTURE EQUIPMENT AND WIRELESS COMMUNICATIONS NETWORKS

CROSS-REFERENCE TO RELATED APPLICATIONS

The present application is based on PCT filing PCT/EP2020/088074, filed Dec. 31, 2020, which claims the Paris Convention priority of European patent application EP 20151243.1, filed Jan. 10, 2020, the contents of each of which are hereby incorporated by reference.

BACKGROUND

The present application claims the Paris Convention priority of European patent application EP20151243.1, the contents of which are hereby incorporated by reference.

Field of Disclosure

The present disclosure relates to methods and apparatus for the communication of signals between various infrastructure equipment, communications devices and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS, Long Term Evolution (LTE) or New Radio (NR) architectures, are able to support a wider range of services than simple voice and messaging services offered by previous generations of mobile telecommunication systems. For example, with the improved radio interface and enhanced data rates provided by LTE or NR systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this, it is desirable to provide routing mechanisms that are adapted to wireless backhauling system having a mesh structure.

SUMMARY OF THE DISCLOSURE

The invention is defined in the appended claims.

According to a first aspect of the present disclosure, there is provided a method for determining a route in an Integrated Access Backhaul "IAB" mesh zone in a mobile telecommunications network comprising a terminal, the IAB mesh zone comprising a centralised unit and a plurality of IAB nodes, the route being for transmitting a packet through a path comprising at least two of the plurality of IAB nodes. The method comprises transmitting, by a routing control unit and to each IAB node of the plurality of IAB nodes, one or more discovery parameters for the each IAB node to determine whether another IAB node of the plurality of IAB nodes is discoverable; determining, by the routing control unit, one or more route selection parameters for the each IAB node to select a route; a first IAB node of the plurality of IAB nodes determining, based on the one or more discovery parameters, that a second IAB node of the plurality of IAB nodes is discoverable; and upon receiving a packet, selecting a route from the first IAB node based on the one or more route selection parameters and on the first IAB node determining that the second IAB node is discoverable.

According to a second aspect of the present disclosure, there is provided a system for determining a route in an Integrated Access Backhaul "IAB" mesh zone in a mobile telecommunications network comprising a terminal, the system comprising the IAB mesh zone wherein the IAB mesh zone comprises a centralised unit and a plurality of IAB nodes, the route being for transmitting a packet through a path comprising at least two of the plurality of IAB nodes. The system comprises a routing control unit configured to transmit to each IAB node of the plurality of IAB nodes, one or more discovery parameters for the each IAB node to determine whether another IAB node of the plurality of IAB nodes is discoverable; determine one or more route selection parameters for the each IAB node to select a route. The system comprises a first IAB node of the plurality of IAB nodes, the first IAB node being configured to determine, based on the one or more discovery parameters, that a second IAB node of the plurality of IAB nodes is discoverable; and to select, upon receiving a packet, a route from the first IAB node and based on the one or more route selection parameters and based on the first IAB node determining that the second IAB node is discoverable.

According to a third aspect of the present disclosure, there is provided a system for determining a route in an Integrated Access Backhaul "IAB" mesh zone in a mobile telecommunications network comprising a terminal, the system comprising the IAB mesh zone wherein the IAB mesh zone comprises a centralised unit and a plurality of IAB nodes, the route being for transmitting a packet through a path comprising at least two of the plurality of IAB nodes. The system is configured to implement any method in accordance with the first aspect.

According to a fourth aspect of the present disclosure, there is provided an Integrated Access Backhaul "IAB" Node for use in a mobile telecommunications network, wherein the mobile telecommunications network comprises an IAB mesh zone comprising a centralised unit, the IAB Node and one or more further IAB Nodes. The IAB Node is configured to receive one or more discovery parameters for determining whether a second IAB node is discoverable, the second IAB node being one of the one or more further IAB Nodes; determine, based on the one or more discovery parameters, that the second IAB node is discoverable; receive, one or more route selection parameters for selecting a route; and select, upon receipt of a packet, a route from the IAB Node based on the one or more route selection parameters and on the IAB Node determining that the second IAB node is discoverable, thereby determining a route for transmitting the packet through a path comprising the second IAB node.

According to a fifth aspect of the present disclosure, there is provided circuitry for Integrated Access Backhaul "IAB" Node for use in a mobile telecommunications network, wherein the mobile telecommunications network comprises an IAB mesh zone comprising a centralised unit, the IAB Node and one or more further IAB Nodes. The circuitry comprises transmitter circuitry configured to transmit signals via a wireless access interface of the IAB Node and receiver circuitry configured to wireless receive signals and controller circuitry. The controller circuitry is configured to control the transmitter and the receiver to receive one or more discovery parameters for determining whether a second IAB node is discoverable, the second IAB node being one of the one or more further IAB Nodes; and receive, one or more route selection parameters for selecting a route. The controller circuitry is configured to determine, based on the one or more discovery parameters, that the second IAB node is discoverable; and to select, upon receipt of a packet, a route from the IAB Node based on the one or more route selection parameters and on the IAB Node determining that the second IAB node is discoverable, thereby determining a route for transmitting the packet through a path comprising the second IAB node.

According to a sixth aspect of the present disclosure, there is a method of controlling an Integrated Access Backhaul "IAB" Node for use in a mobile telecommunications network, wherein the mobile telecommunications network comprises an IAB mesh zone comprising a centralised unit, the IAB Node and one or more further IAB Nodes. The method comprises receiving one or more discovery parameters for determining whether a second IAB node is discoverable, the second IAB node being one of the one or more further IAB Nodes; determining, based on the one or more discovery parameters, that the second IAB node is discoverable; receiving, one or more route selection parameters for selecting a route; and selecting, upon receipt of a packet, a route from the IAB Node based on the one or more route selection parameters and on the IAB Node determining that the second IAB node is discoverable, thereby determining a route for transmitting the packet through a path comprising the second IAB node.

According to a seventh aspect of the present disclosure, there is provided a computer program comprising instructions which, when executed, cause the implementation of any method in accordance with the first or sixth aspect.

It is to be understood that both the foregoing general description and the following detailed description are illustrative, but are not restrictive, of the present technology. The described illustrative examples, together with further advantages, will be best understood by reference to the following detailed description taken in conjunction with the accompanying drawings.

BRIEF DESCRIPTION OF THE DRAWINGS

Techniques and teachings provided herein will be better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
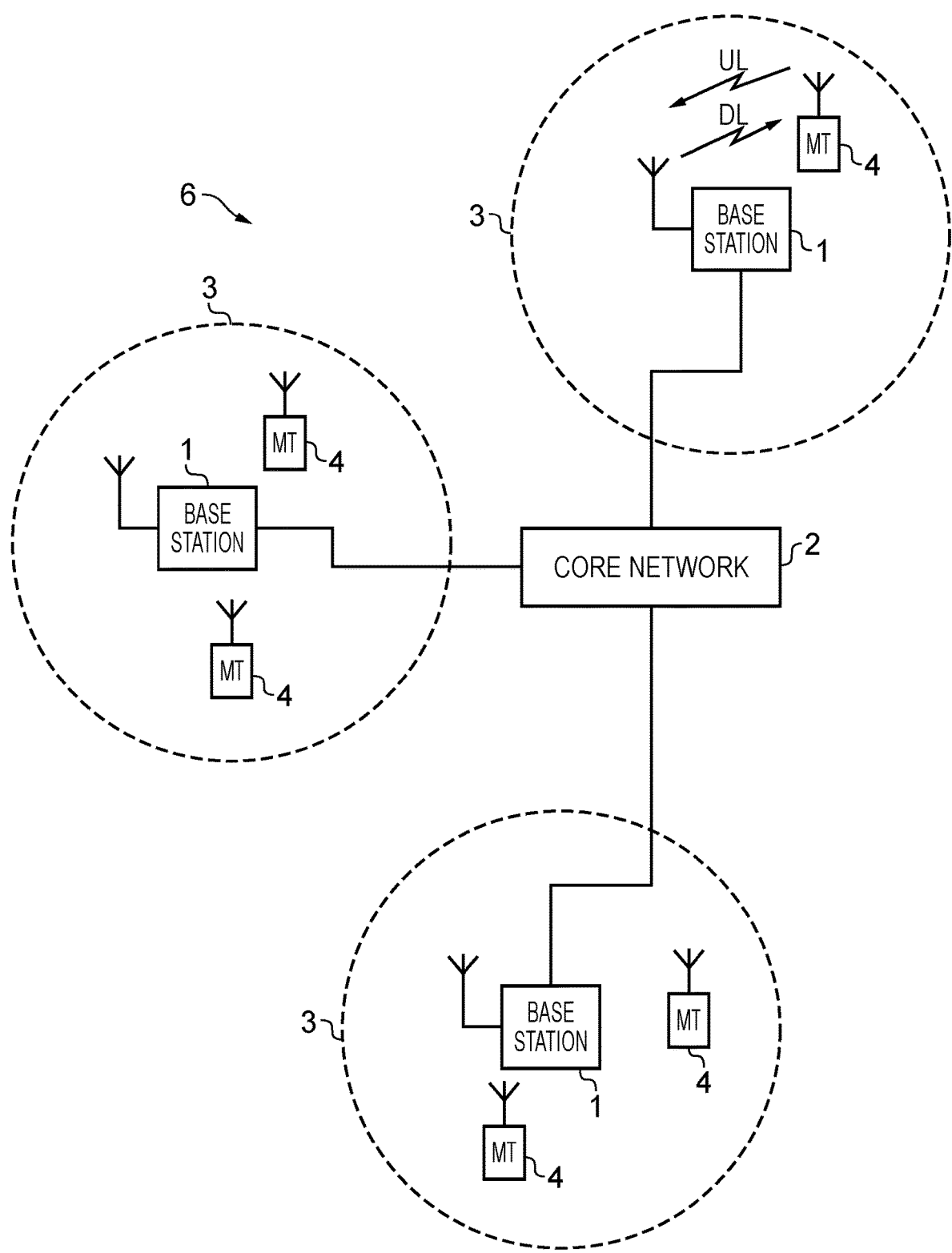
FIG. 1 schematically represents some aspects of a LTE-type wireless telecommunication system.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
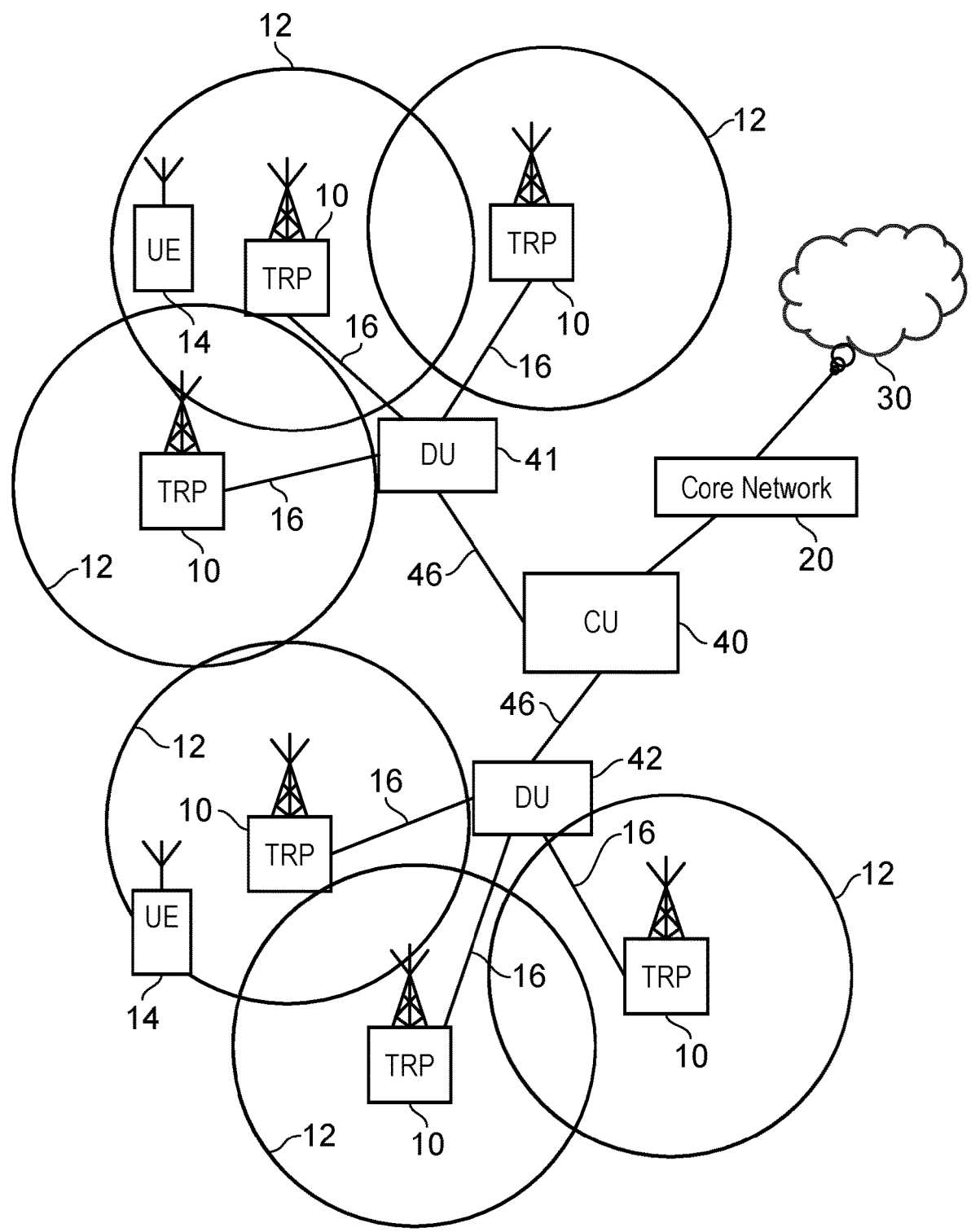
FIG. 2 schematically represents some aspects of a radio access technology (RAT) wireless communications system.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. In other example, one or more of the DUs may be connected to a single transmission and reception point each. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1 and the distributed and central units may operate in a similar way to corresponding gNB-DU and gNB-DU elements in a NR/5G network. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. In some example, the TRPs 10 of FIG. 2 can correspond to a Remote Radio Head (RRH) and/or an antenna system such as one that can be found in a base station, eNB and/or gNB. Similarly the communications devices 14 may have a functionality corresponding to the UE devices 4 known for operation with an LTE network or a NR/5G network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. For example, while the scheduling of transmissions is expected to be done at the MAC layer, which itself is expected to be in TRPs, some scheduling decisions (e.g. on which scheduling scheme the MAC layer should use) may be taken by a different function, for example an RRC function which can configure a MAC function. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
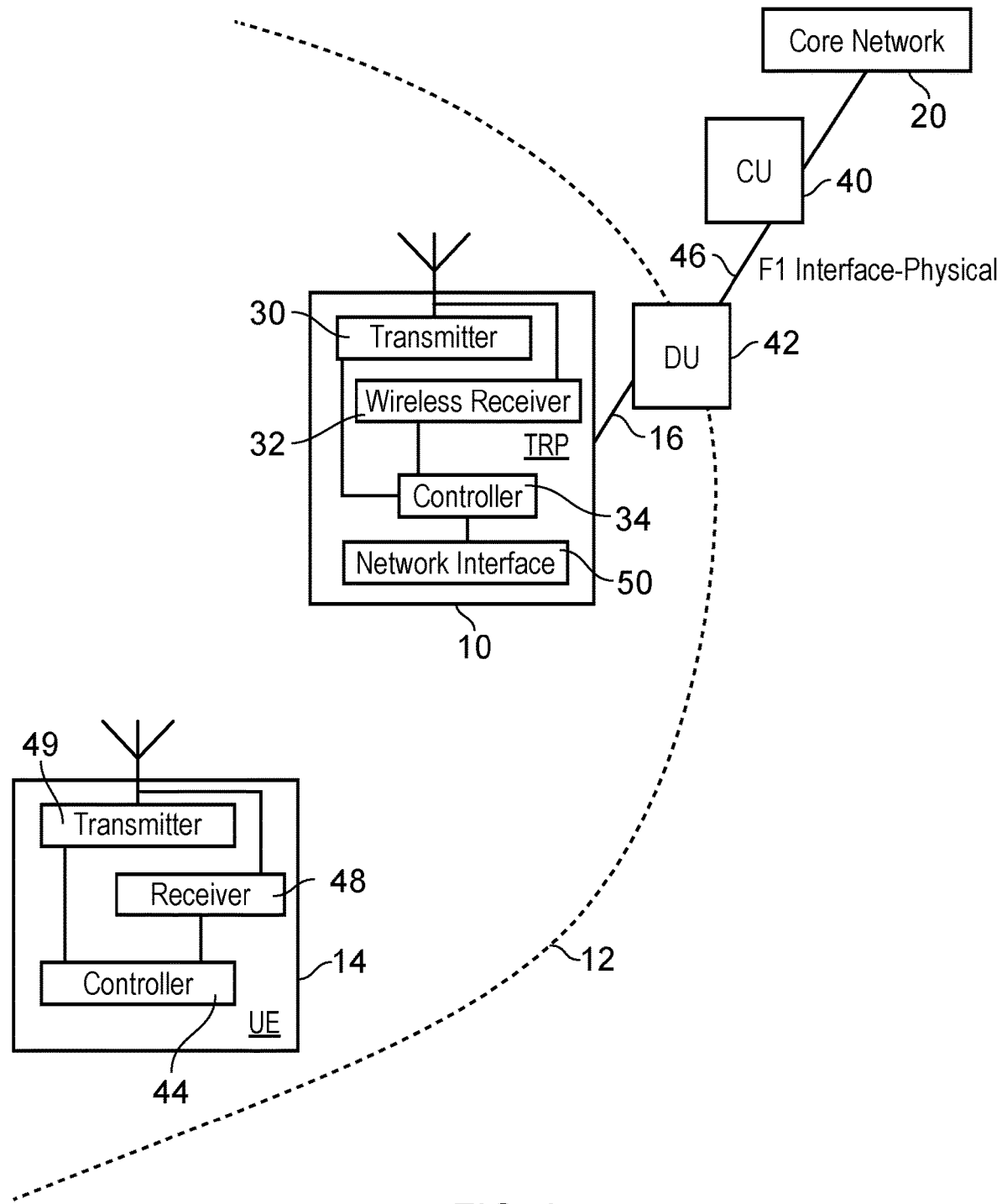
FIG. 3 is a schematic block diagram of some components of the wireless communications system shown in FIG. 2.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard (or in accordance with another communication standard). The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a logical and/or physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical and/or a logical interface. The F1 interface 46 between CU and DU may operate in accordance with specifications 3GPP TS 38.470 and 3GPP TS 38.473. In most cases, it is expected to be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Figure 4:
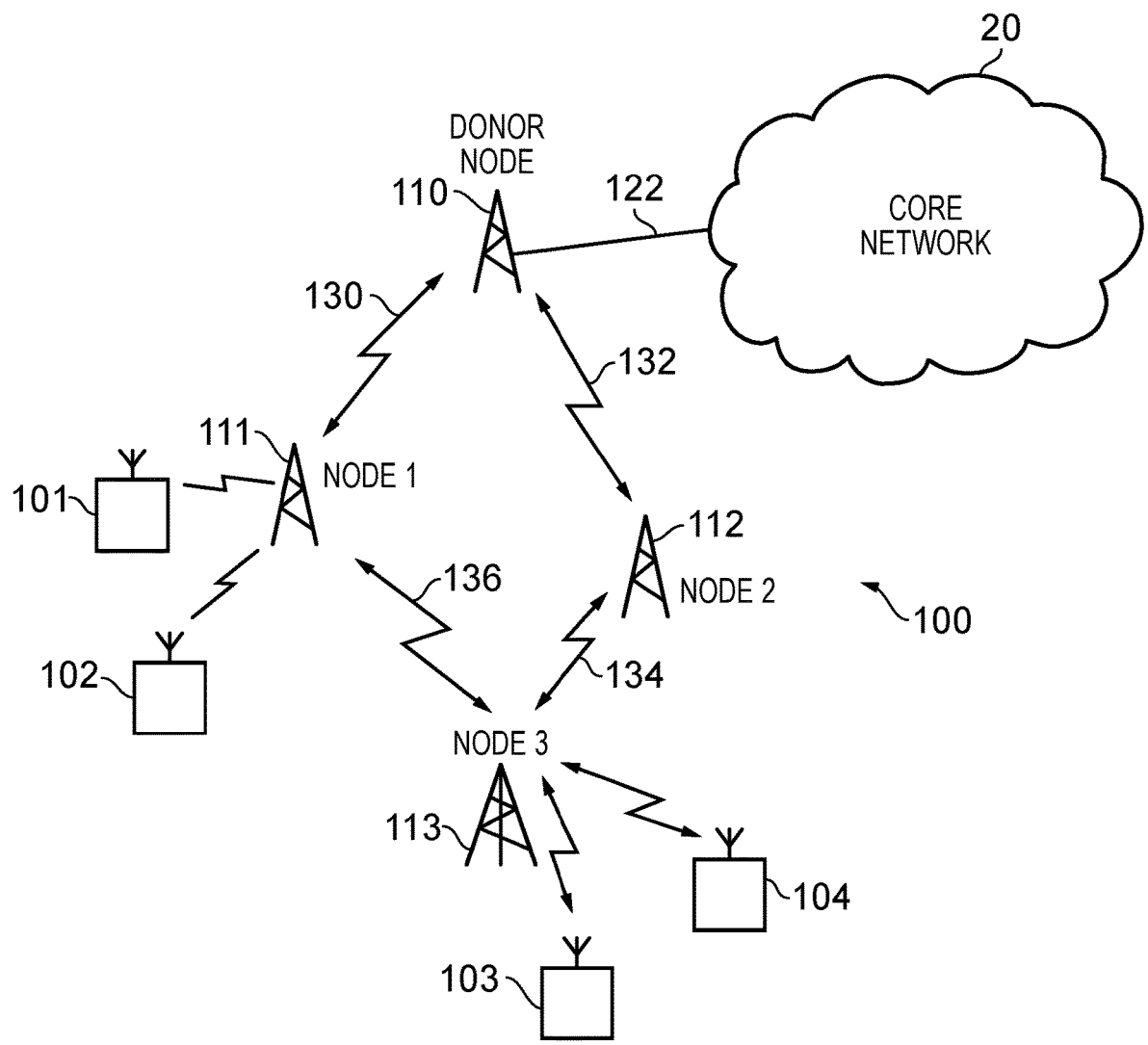
FIG. 4 schematically represents some aspects of an example wireless telecommunication network.

Example arrangements of the present disclosure can be used in a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 can provide a backhauling function by transmitted data from terminals to the core network through two or more of the infrastructure equipment nodes, e.g. through an infrastructure equipment node directly connected to the core network and one or more additional infrastructure equipment nodes. Accordingly, the infrastructure equipment nodes 110 to 113 can also be referred to as IAB nodes, with infrastructure equipment 110 being then referred to as the IAB donor node. The IAB nodes 111 to 113 in FIG. 4 are expected to include at least a DU part and a mobile terminal (MT) part. The MT part can be used by a (non-donor) IAB node to connect to the next upstream infrastructure node. The donor IAB node 110 is expected to include at least a DU part and to include or be connected to a CU. Any of the IAB nodes may also include one or more extensions such as a TRP, RRH and/or antenna system if appropriate. In some examples, one or more of the infrastructure equipment 110 to 113 (e.g. the first infrastructure equipment 110) may comprise a CU 40 as discussed with respect to FIG. 2 and FIG. 3

The first infrastructure equipment 110 in FIG. 4 is connected to the core network 20 by means of one or a series of connections. For example, the first infrastructure equipment 110 has one or more interfaces to the core network, such as an NG interface in NR or an S1 interface in LTE. These one or more interfaces can be carried over the one or series of connections which may for example be wired or wireless connections. For example, the connection may use one or more of optical, copper, cabled, fixed, wireless, WiMax, cellular, etc. physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct interface between (1) any of the second, third and fourth infrastructure equipment 111-113 and (2) the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has an interface to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a DU part and an MT part. For example the DU part (e.g. module or function) can be broadly similar in functionality to the DUs 41, 42 of FIG. 2.

In some arrangements of the present technique, one or more of the second to fourth infrastructure equipment 110 to 113 may comprise a DU and one or more CUs.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113. In other words, the second, third and fourth infrastructure equipment 111-113 will each be expected to have a F1 or F1-like (e.g. F1*) interface between its DU and between the CU associated with the first infrastructure equipment 110. The CU associated with the first infrastructure equipment 110 may be co-located with the first infrastructure equipment 110 or may provided beyond the first infrastructure equipment 110.

In order to provide the transmission of the uplink data or the downlink data between a communications device and the core network, a route is determined with one end of the route being a piece of infrastructure equipment directly interfaced to a core network and by which uplink and downlink traffic is routed to or from the core network.

In the following, the term 'node' is used to refer to an entity or infrastructure equipment which forms a part of a route for the transmission of the uplink data or the downlink data and which includes at least one of a DU and/or CU. In some examples, a node can be an entity or infrastructure equipment which forms a part of a route for the transmission of the uplink data or the downlink data and which comprises at least a DU.

An infrastructure equipment which is directly interfaced or connected to the core network and operated in accordance with an example arrangement may provide communications resources to other infrastructure equipment and so is referred to as a 'donor node'. In some examples, a donor node is a node that is associated with a CU interfaced to the core network, wherein the CU can operate as a CU for the DU of the donor node and for a DU of one or more further nodes, e.g. intermediate or relay nodes (see below).

An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. For example, one or more mobile terminal may connect directly to a DU comprised in or associated with the relay node.

The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 (or downlink data to the fourth communications device 104) may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20 (or receives the downlink data from the core network, respectively).

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be available for the transmission of the uplink/downlink data from/to a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are generally described with nodes being infrastructure equipment however the present disclosure is not so limited. A node may comprise at least a transmitter, a receiver and a controller. In some arrangements of the present technique, the functionality of a node (other than the donor node, e.g. relay or end node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route. In other words, a relay node can for example be configured to operate as a relay node only, not as an end node.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface. In many examples, it is expected that the interface between two of the infrastructure equipment 110-113 will be implemented using a Uu or Uu-like interface, for example a NU-Uu interface.

A wireless access interface which provides an inter-node wireless communications link may also be used for communications between one of the infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present disclosure, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

A study item on Integrated Access and Backhaul for NR [3] has been approved. Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimisation;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
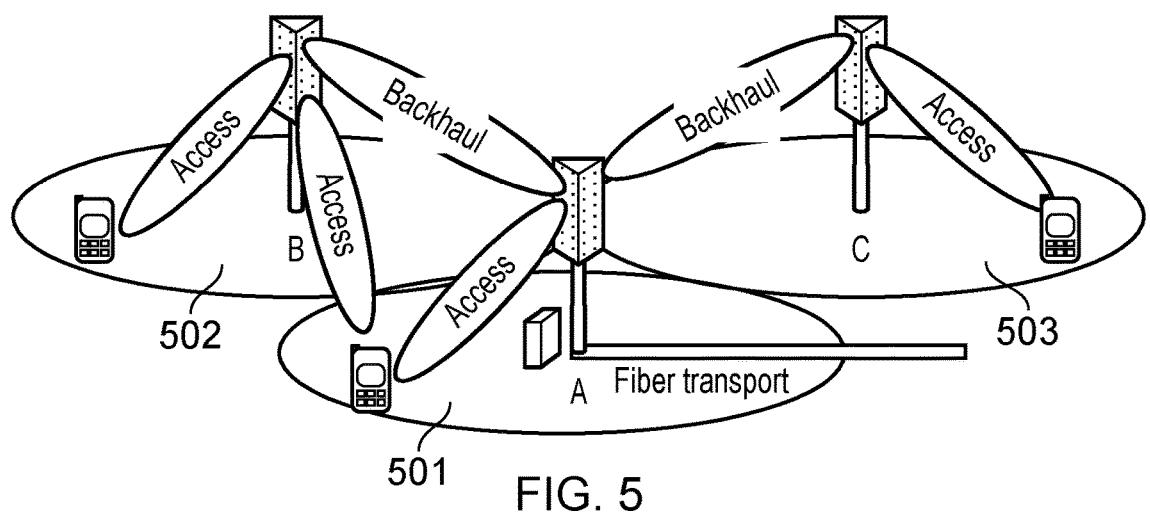
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 16 NR specifications should be reused as much as possible in the design of the backhaul link, with enhancements considered.

Figure 6A:
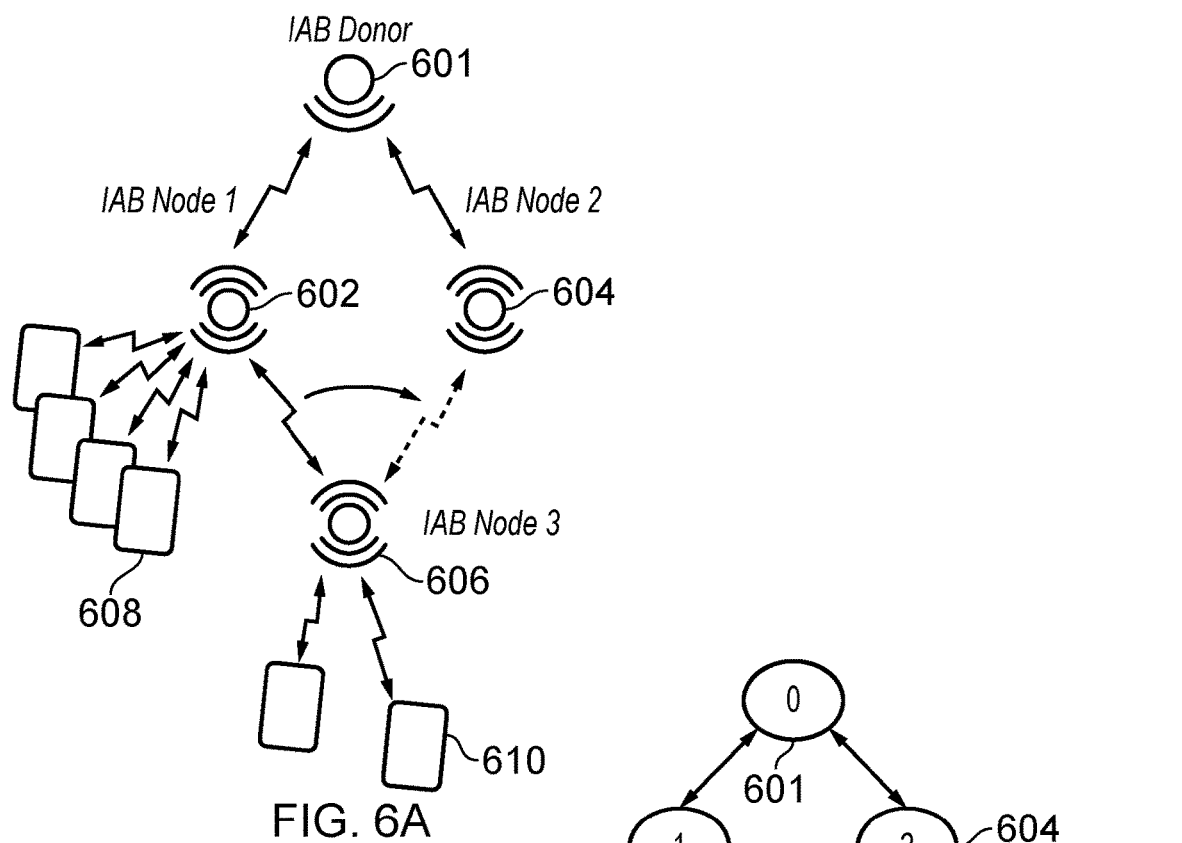
FIG. 6A is reproduced from [5], and provides a second example of an IAB deployment scenario in which there are multiple candidate routes each comprising multiple hops from the end node to the donor node.

FIG. 6A is reproduced from [5], and shows an example of a wireless communications system comprising a plurality of IAB-enabled nodes, which may for example be TRPs/DUs forming part of an NR network. These comprise an IAB donor node 601 which has a direct connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 has wireless access connections to UEs 608 and 610 respectively. As shown in FIG. 6A, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link. Hence, knowing how to manage the candidate routes efficiently and effectively is important to ensure timely data transmission between relay nodes, especially when considering the characteristics of wireless links.

In the case that the link between the first IAB node 602 and the third IAB node 606 is deteriorating, or the first IAB node 602 becomes overloaded, one of the nodes in the system (this could be the donor node 601 or the first IAB node 602 itself) can make a decision to change the route from the third IAB node 606 to the IAB donor node 601 from that via the first IAB node 602 to that via the second IAB node 604.

In FIG. 6A, only the IAB Donor gNB 601 has a fixed line backhaul into the core network. In an example, the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In this field, the first IAB Node 602 in such a system as that of FIG. 6A is sometimes called a "hop"—it relays communications between the end (third) IAB node 606 and the donor IAB node 601. In this example, the backhaul link to the first IAB Node 602 requires enough capacity to support the traffic from all the UEs 610, bearing in mind that some of these may have stringent quality of service (QoS) requirements that translate into high traffic intensities. In the example of FIG. 4, the number of connections between nodes is relatively limited such that the number of routes available is also limited. If however the number of nodes and inter-node connections increases, the number of routes available will increase even faster.

Figure 6B:
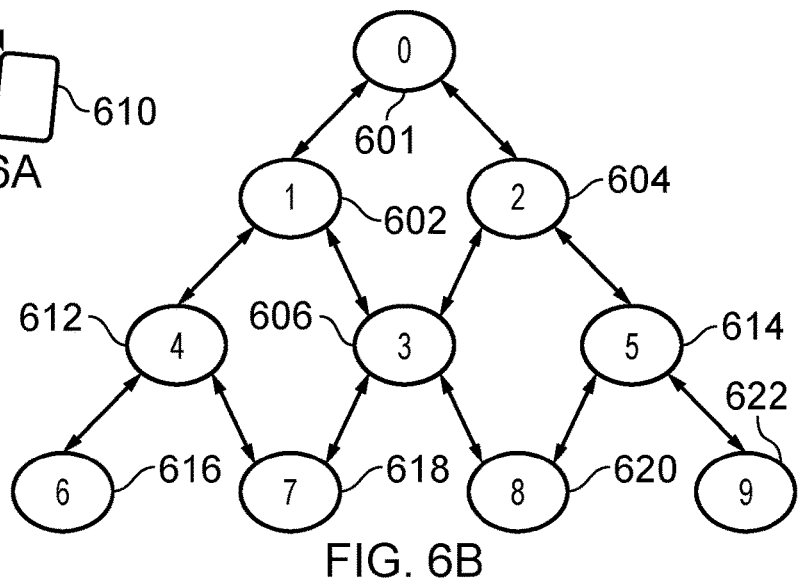
FIG. 6B is an extended version of FIG. 6A, providing a third example of an IAB deployment scenario in which there are multiple candidate routes each comprising multiple hops from the end node to the donor node.

FIG. 6B is an extended version of FIG. 6A, and shows an illustrative example where there are multiple layers of IAB nodes in the deployment scenario. In the example of FIG. 6A, the third IAB node 606 is the child node of the first IAB node 602, and the first IAB node 602 may be the parent node of the third IAB node 606. However, a parent node may not necessarily be the next node up (i.e. one hop in the uplink direction) towards the IAB donor node 601. A parent node may be more than one hop away from its child node or children nodes, and is in a general sense configured to allocate uplink communications resources to the child node. For example, the donor IAB node 601 may in fact be the parent node of the third IAB node 606. This is shown with greater clarity in FIG. 6B.

In FIG. 6B, in addition to IAB node 601, 602, 604 and 606 as shown in FIG. 6A, there are additional IAB nodes 612 and 614 at the same layer or level of the network as IAB node 606. Below these are IAB nodes 616, 618, 620 and 622, which are now end nodes, in that they have no downlink backhaul connections to other IAB nodes. Here, it could be that the first IAB node 602 is still the parent of the third IAB node 606, but may also be the parent of IAB node 612. Further, the first IAB node 602 may be the parent of IAB nodes 616, 618 and 620 too, or may be a grandparent node to these nodes if nodes 606 and 612 are their parents. Furthermore, some child nodes may have multiple parent nodes, and can select from between them when transmitted uplink data in dependence on certain criteria, such as relative link qualities between the child node and its multiple parent nodes, or a relative load status between the parent nodes, for example.

It is worth noting that FIG. 6B merely provides an illustrative example arrangement and other configurations are conceivable, with for example IAB node 7 618 being connected wirelessly to one or more IAB node 1 602, IAB node 5 614, IAB node 6 616, etc. In other words, the structure for the network of nodes associated with donor IAB node 0 601 is not limited to a tree-like or other regular/patterned structure like the one illustrated in the example of FIG. 6B.

Various architectures have been proposed in order to provide the IAB functionality. The below described example arrangements of the present disclosure are not restricted to a particular architecture and may be used with any technically suitable architecture. However, a number of candidate architectures which have been considered in, for example, 3GPP document [6] are described below (and which have also been included in document [4]).

Figure 7:
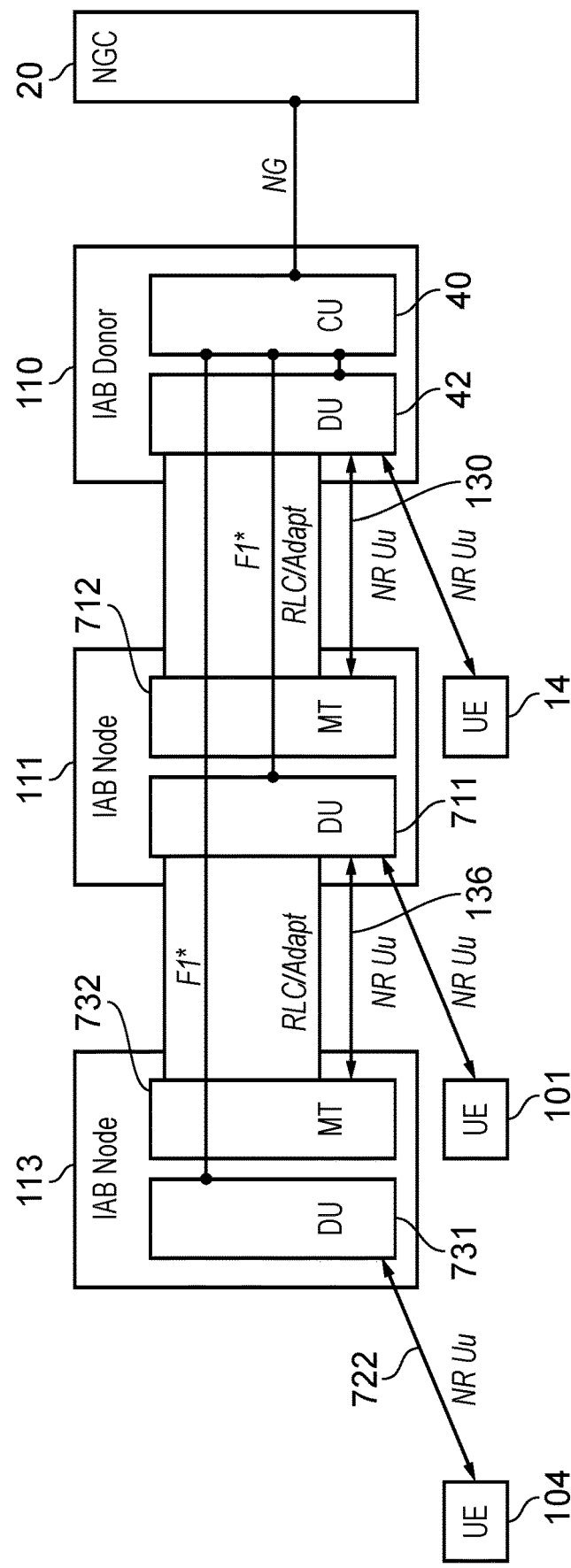
FIG. 7 is a block diagram illustrating a first possible network architecture for providing a wireless backhaul by means of IAB in a wireless telecommunication network.

FIG. 7 illustrates one possible architecture, sometimes referred to as "Architecture 1a", by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110. Re-using existing interfaces can facilitate the deployment of an IAB arrangement as an IAB node can for example comprise existing MT and DU elements which have been adapted to work in an IAB network, rather than providing entirely new elements and interfaces to enable the use of a backhauling system.

Similarly, an end node (such as the Node 3 113) may provide a Uu wireless interface 722 for the fourth UE 104 to communicate with the DU 731 of the Node 3 113.

Figure 8:
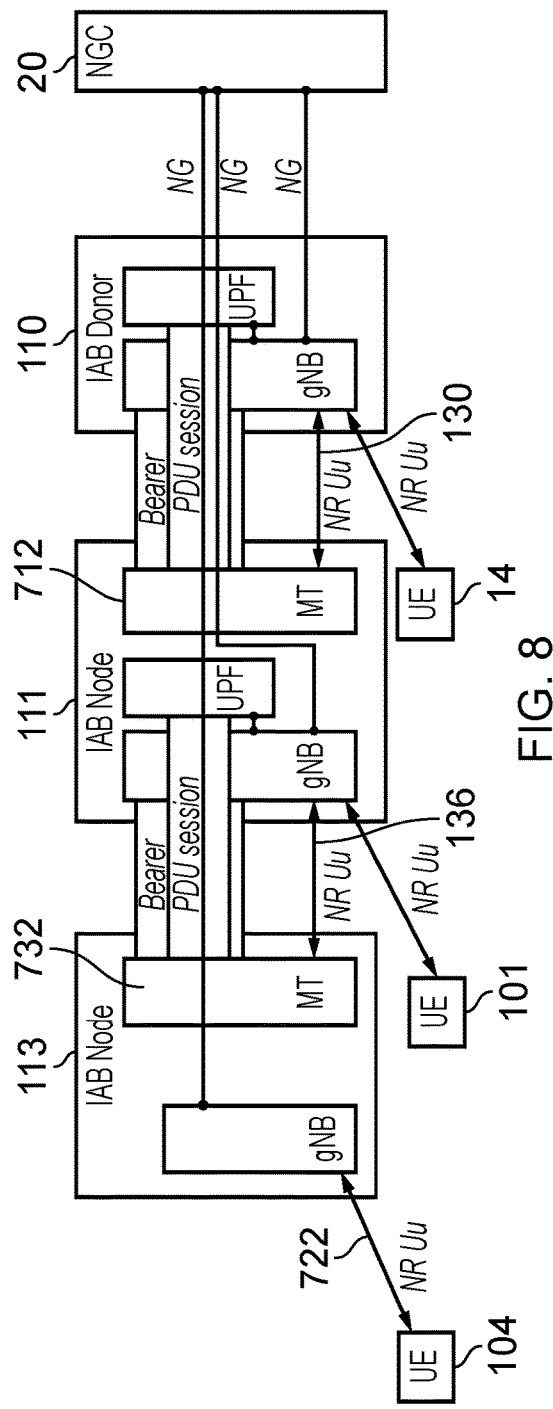
FIG. 8 is a block diagram illustrating a second possible network architecture for providing a wireless backhaul by means of IAB in a wireless telecommunication network.
Figure 9:
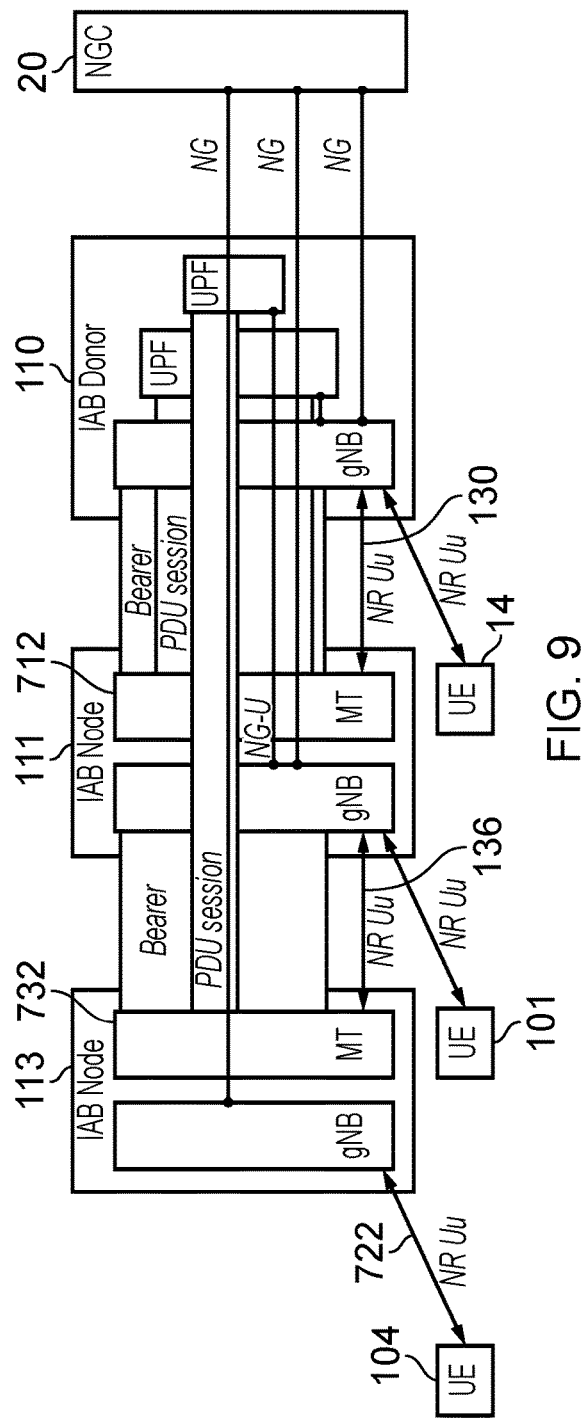
FIG. 9 is a block diagram illustrating a third possible network architecture for providing a wireless backhaul by means of IAB in a wireless telecommunication network.

Alternative candidate architectures for the provision of IAB are provided in FIG. 8 and FIG. 9, sometimes referred to as "Architectures 2a and 2b" respectively. In both FIG. 8 and FIG. 9, each IAB node includes a gNB function, providing a wireless access interface for the use of downstream IAB nodes and wireless communications devices. The gNB function will conventionally include at least a DU function and potentially a CU function as well. The DU function of the relay or end nodes 111, 113 can for example be controlled by a CU function associated with the IAB donor node 110.

FIG. 9 differs from FIG. 7 in that, in FIG. 7, PDU sessions are connected end-on-end to form the wireless backhaul; in FIG. 9, PDU sessions are encapsulated so that each IAB node may establish an end-to-end PDU session which terminates at the IAB donor node 110.

Figure 10:
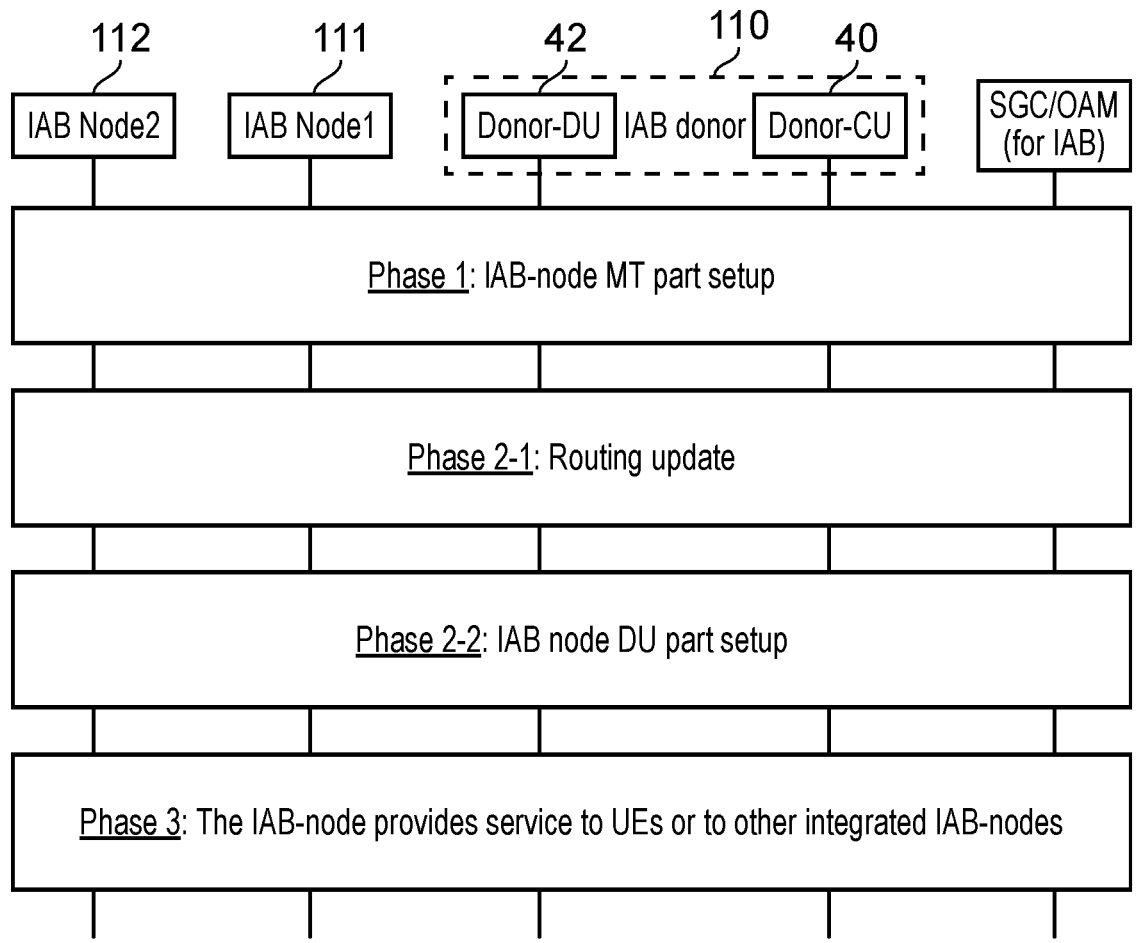
FIG. 10 is reproduced from [4] and provides an example of an IAB node integration procedure.
Figure 11:
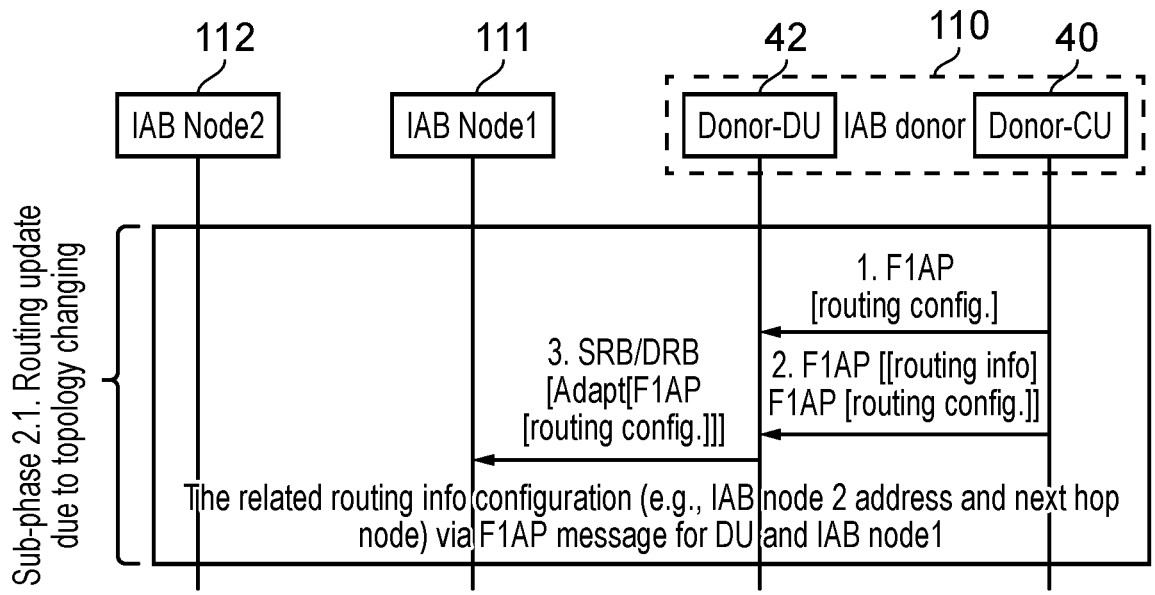
FIG. 11 is reproduced from [4] and provides an example of an IAB Routing Update procedure identified as Phase 2-1 in FIG. 10.

In the Release 16 sets of standards for IAB, the systems are designed to include static nodes in the network. Accordingly, the nodes themselves are not expected to be mobile (in the moveable or portable sense). Once they have been recognised and added to the network, it is expected that the configuration will be suitable to be used until a node is added or removed from the system. FIGS. 10 and 11 illustrate how a node can be added to an IAB system, as defined in Release 16 document 38.874 (V16.0.0) [4]. These figures illustrate a situation where an existing IAB Node1 111 is already connected to a donor node 110 and where a second IAB Node2 112 joins the IAB network through IAB Node1.

FIG. 10 is reproduced from [4] and provides an example of an IAB node integration procedure. The integration procedure will for example include first setting up the MT part of the new IAB node, so that it can connect to the other nodes (Phase 1). In the second phase the IAB functions of the node can be activated by (1) updating the routing configuration in view of the new IAB node (Phase 2-1) and (2) configuring the DU part of the IAB node (Phase 2-2). Once this has been setup, the IAB node can be used by UEs or other IAB nodes to provide the wireless backhauling.

During Phase 1, the IAB Node 2 112 first connects through the LTE network and then is being configured so that it can join the IAB system by performing discovery, measurement and measurement reporting of candidate parent IAB-nodes to the eNB. At the end of Phase 1, the IAB Node 2 112 is connected to the network through the IAB Donor-CU 40 of the IAB Donor node 110 and can complete its connection to the network, for example with an RRC connection setup to setup up any radio bearer it may need.

In most cases, the present disclosure will assume that Phase 1 has already been completed and that routing of messages needs to be configured. For example, the teachings of the present invention will be particularly valuable once any new IAB node will be connected to the network and when routing in the mesh network is not yet taking this into account or when routing in the mesh network is being reviewed or refreshed (e.g. on request or periodically).

FIG. 11 is reproduced from [4] and illustrates the IAB Routing Update procedure identified as Phase 2-1 in FIG. 10. This phase starts once Phase 1 has completed. In particular, the MT part of IAB Node 2 112 connects to IAB Node 1 111 and once this is configured, there is an established communication link between IAB Node 1 111 and IAB Node 2 112 which can be used for backhauling purposes. Once the new IAB Node2 112 is connected to the IAB donor Node 110, routing information can be updated on IAB Node2's parent and child node(s) so that there is a backhaul path between the IAB Node2 112 and the IAB Donor 110. The new IAB node Node2 112 will be assigned an identifier and the routing information for the other nodes will be updated to include Node2 where appropriate. As shown in FIG. 11, this will involve for example sending routing configuration from the Donor Node 110 to IAB Node 1 111. This routing update procedure may be carried out using F1-AP, IPv6 or adaptation layer (see [4]) protocols.

While the Release 16 documents discuss updating the routing configuration of the IAB network once a new node joins the IAB network, it does not specify which routing mechanism the IAB nodes should rely on for routing traffic within the IAB network and it only considers a situation where the nodes are static and do not move—such that the routing conditions are not expected to change often or regularly.

On the other hand, with Release 17 and more recent development, IAB networks are being considered where the IAB nodes may be less static and more mobile (i.e. wherein the geographical arrangement of the nodes, e.g. their relative positioning, is expected to vary much more dynamically) and/or where there may be more nodes. Generally, the structure of the IAB network is much more mesh like. Using an arrangement similar to the one described in [4] and discussed in respect of FIGS. 10 and 11 above would therefore likely result in a large increase in signalling any time a node joins or leave the IAB network and in a routing configuration that may not be adjusted or adapted in a timely manner as the relative position of and/or the links between the IAB node varies with time. Additionally, this arrangement would not scale well as the number of IAB nodes increases and the amount of signalling and processing that would be required would reduce the efficiency and available throughput of an IAB mesh network.

Accordingly it would be desirable to have routing mechanisms which would be better adapted to the direction taken by IAB networks, wherein such IAB networks will involve a complex combination of backhauling, shared link capacity (e.g. with data traffic) and mesh-like connections (which can increase polynomially or exponentially with the number of nodes and therefore have scalability implications).

According to an example of the present disclosure, there is provided a method for determining a route in an Integrated Access Backhaul "IAB" mesh zone in a mobile telecommunications network for providing wireless connectivity to one or more terminals. The IAB mesh zone comprises a centralised unit and a plurality of IAB nodes where the IAB nodes are connected to a core network of the mobile telecommunications network through the centralised unit. The centralised unit may be associated with—or in some cases include—a distributed unit (DU) where the centralised unit and distributed unit would at least logically form a donor IAB node for the mesh zone. The mesh zone may be defined as a group of IAB nodes served by the centralised unit. In some cases, a zone may be defined as all IAB nodes served by the centralised unit (e.g. actually or potentially served) and in other cases a zone may be defined as all IAB nodes (actually or potentially) served by a combination of a CU and a corresponding DU comprised in a donor node. The CU does not have to be co-located with the DU of the donor nodes and in some cases it may be located in a separate physical piece of equipment. Accordingly, if a terminal is served by the mesh zone, the route for transmitting packets or traffic associated with a terminal (e.g. backhauling to the core network in uplink) will be through a path comprising at least one of the plurality of IAB nodes and the centralised unit.

Figure 12:
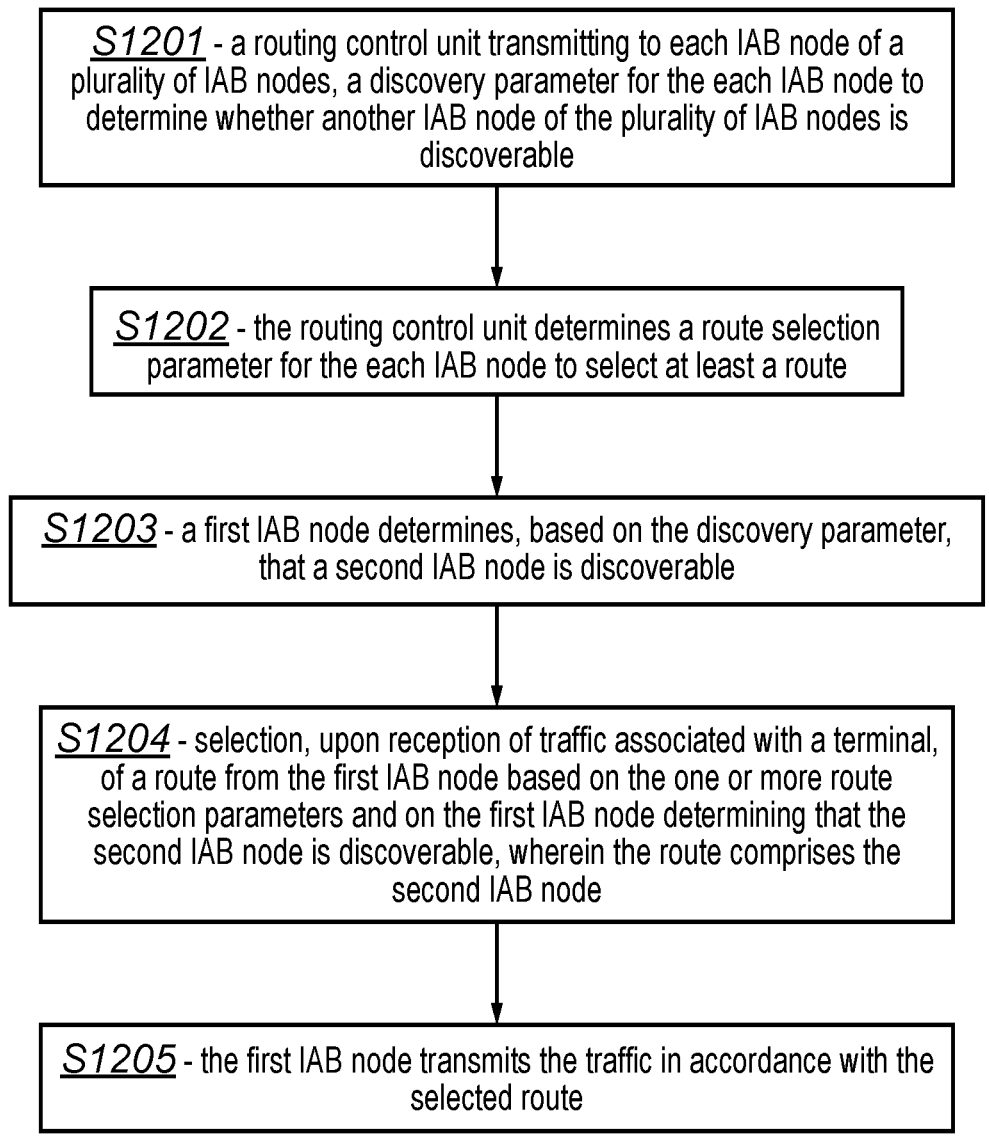
FIG. 12 illustrates an example method for determining a route in an IAB mesh zone in accordance with an example of the present disclosure.

FIG. 12 illustrates an example method for determining a route in an IAB mesh zone in accordance with an example of the present disclosure.

The method comprises at S1201 transmitting, by a routing control unit and to each IAB node of the plurality of IAB nodes, one or more discovery parameters for the each IAB node to determine whether another IAB node of the plurality of IAB nodes is discoverable. The routing control unit may sometimes be part of the centralised unit CU or may be co-located with the CU but in other cases the routing control unit may be provided separately, for example in the core network. Also, in some cases the discovery parameters will be identical for all IAB node of the plurality of IAB nodes but in other cases a first IAB node of the plurality of IAB nodes may receive first one or more discovery parameters and a second IAB node of the plurality of IAB nodes may received second one or more discovery parameters. The one or more discovery parameters may for example be adjusted based on the type of IAB node, on the location of the IAB node, on a power configuration of the IAB node, on a battery condition or configuration of the IAB node, on an actual or estimated mobility parameter of the IAB node, etc.

For example, the discovery parameter(s) can define a measurement parameter comprising an indication to measure a signal strength or power, a link quality, a relative distance or mobility parameter used for determining whether the neighbour can be identified or declared as discovered. The parameter(s) may also include one or more thresholds associated with a measurement. For Example, it can define a minimum signal strength or power or a minimum link quality between the first IAB node and the neighbour. It can also define a maximum interference level, a maximum estimated relative distance, etc. Additionally, the parameter(s) can define one or more timing parameters for the IAB node to determining the timing of a discovery procedure. For example, the timing parameter can define a period or frequency for the IAB node to carry out discovery, a minimum or maximum time between two discovery procedures, a request to carry out a discovery procedure (e.g. at the next opportunity) and/or any other parameter that the IAB node can use to determine when to attempt a discovery procedure.

At S1202, the routing control unit can determine a route selection parameter for the each IAB node to select at least a route towards the centralised unit or towards another IAB node or towards the terminal, for example an IAB node may receive one or more parameters that they can use to determine a next hop or a route for transmitting the traffic. It should be noted that in some cases, an IAB node might receive a first route selection parameter and another IAB node might receive a second route selection parameter different from the first route selection parameter. In other words, different IAB nodes might receive different route selection parameters. In other cases, all IAB nodes in the mesh zone might receive the same route selection parameter(s), or at least one common route selection parameter(s) to be using across the IAB mesh zone.

As the skilled person, will appreciate, the route discovery function and route selection function may be provided as two separate functions, units or module (physically and/or logically) in an IAB Node (whether for determining, sending, receiving and/or using the route discovery or selection parameters). Also, the steps of the method of FIG. 12 may be carried out in any particular order. For example, the steps of FIG. 12 may be carried out in a different order and may be fully or partially performed in parallel. In one example, steps S1201, S1203 can be performed independently from steps S1202 and S1204. In one particular example, steps S1201 and S1203 can be carried out first so that IAB nodes can determine which other nodes can be treated as neighbours for backhauling. Then steps S1202 S1204 can be performed whenever appropriate, for example when traffic is to be transmitted by an IAB node. It is also conceivable that while steps S1202 and S1204 are carried out, one or both of steps S1202 and S1204 are carried out again.

The route selection parameter can be used to route the traffic, e.g. one or more packets, at least to the next hop. In other words, sometimes a first IAB node will forward the traffic to another IAB node without knowledge of the rest of the route from the first IAB node to the destination IAB node or terminal or donor Node. For example, it will leave the next hop to decide on an appropriate next hop for the traffic. In other cases, routes can be predefined within the mesh network and a route identifier can be used to know which route should be used for transmitting the traffic.

The route selection parameter can include one or more of a routing table, a route identifier, a threshold for selecting a route, a quality or priority parameter for selecting a route, a number of hops criterion, a delay criterion, a reliability criterion and a throughput criterion. In some cases it can be used in association with additional routing information, for example one or more of a routing protocol, a routing table format, etc. which can enable the IAB node to determined one or more routing mechanisms or configurations used in the IAB mesh zone.

An IAB node may include two or more routing parameters when selecting a route and these parameters may have been sent separately. For example, if additional routing information is provided to the IAB node, it can sometimes be received separately from the route selection parameter(s). In one example, a routing protocol and a corresponding routing table may first be sent to an IAB node which indicates to the IAB node which next hop should be used depending on one or more of a route indicator, a quality indicator, a priority indicator, etc. The IAB node may then determine which route (at least to the next hop) it can use—or select from—to transmit traffic arriving from the mesh zone using one or more of a route indicator in the traffic, a quality (e.g. QoS, latency, throughput, . . . ) indicator associated with the traffic, etc.

At S1203 first IAB node of the plurality of IAB nodes can determine, based on the discovery parameters received from the routing control unit, that at least a second IAB node of the plurality of IAB nodes is discoverable. Accordingly, the IAB node can determine autonomously whether a neighbour is discoverable for routing purposes based on the previously received parameter(s). In cases where the IAB node reports on detected neighbours (e.g. to the donor IAB node, CU and/or core network), the IAB node may then only report on the IAB node that it has identified or determined as discoverable and thus as a routing neighbour.

At S1204 and upon receiving traffic associated with the terminal, at least a route from the first IAB node (e.g. towards the centralised unit or donor node or the terminal, depending on whether the traffic is uplink or downlink), can be selected based on the one or more route selection parameters and on the first IAB node determining that the second IAB node is discoverable, the route comprising the second IAB node. In some cases, this can be done by the first IAB node selecting a route based on information related to the traffic (e.g. source, destination, class of user or service, QoS parameter, priority, etc.) and on a local routing table (which may have been partially or fully determined by the IAB node and/or configured by centralised unit).

In some cases, the IAB node may also use additional information to select the route. For example, it may use information regarding traffic load on one or more links or traffic and/or processing load for one or more IAB nodes when determining which route to use, number of hops already done (e.g. if a hop counter is provided), loop detection mechanisms, load balancing, etc.

In some cases, the first IAB node will determine the route (and possibly others, e.g. a routing table) based on the other IAB node(s) that have been determined to be discoverable and on route selection parameter(s) received from the routing control unit. The IAB node can then select the route accordingly.

In other cases, the first IAB node will report on the detected neighbours, for example to the donor node or centralised unit. The routing determination unit (which can be co-located with or associated with routing control unit, donor node or another element external to the first IAB node) can then make a determination on which route(s) the first IAB node (or maybe also other IAB nodes) will have available to them. In one example, the routing determination unit will transmit the determined route(s) to the first IAB node so that the first IAB node can make use of the routing information to route traffic going through the IAB node.

In some cases, the traffic might include a route selection parameter on which the route selection can be based. In a case where one route is identified, the first IAB node can select a route based on the route selection parameter and on routing information from the centralised unit.

Optionally, once the first IAB node has determined a route for routing the traffic, it can transmit the traffic in accordance with the selected route at S1205. Depending on whether the traffic is uplink or downlink traffic, the first IAB node will transmit the traffic towards the centralised unit or towards the terminal, respectively. These are directions of travel rather than next hops and the next hop for the traffic may be the CU or terminal or may be another IAB node, depending on the selected route. Also, in some cases, the traffic may be sidelink traffic which may not have a terminal or a remote party as the destination but it may be another IAB node within the mesh network. In this context, the remote party is remote from the perspective of the mesh IAB network and terminal. For example, it could be an element in the core network, another terminal in another part of the same mobile network or in another mobile or non-mobile network, a server, etc.

Accordingly, the arrangement provided above enables the IAB mesh network to be configured coherently in a manner that can scale up and that can provide a balance between control from an entity and autonomy at the IAB node level which is particularly suited to IAB mesh networks. For example, when reporting is used, the level of reporting can be adjusted by adjusting the discovery parameter to reach a balance between reducing unnecessary reporting of neighbours (e.g. which will not qualify as routing neighbours) and detecting neighbours and routes possibly available. Even when no reporting is used, the discovery parameter can help the IAB nodes determining whether a route is available or not without necessarily receiving further input from an external element. For example, if an IAB node has a table of available, configured and/or preferred routes, it can select a route based on the discovery/routing information parameter. For example, we can consider an example situation where the IAB node comprises or is configured with a routing table that includes three routes R1, R2 and R3 to the donor IAB node (e.g. on the uplink) by order of preference. The IAB node may also determine that the next hop for R1 is not discoverable based on the discovery parameter(s) but that the next hops for R2 and R3 are discoverable and can for example select route R2 to send the traffic. Accordingly, the IAB node can relatively autonomously determine routes for traffic (which helps keep the routing overhead down) while keeping a degree of control and oversight from the network, e.g. through the routing control unit.

In order to better illustrate how the invention might be used, the following more detailed examples are provided for illustrative purposes.

Example 1-1

CU-Controlled Route Discovery and Establishment

Figure 13:
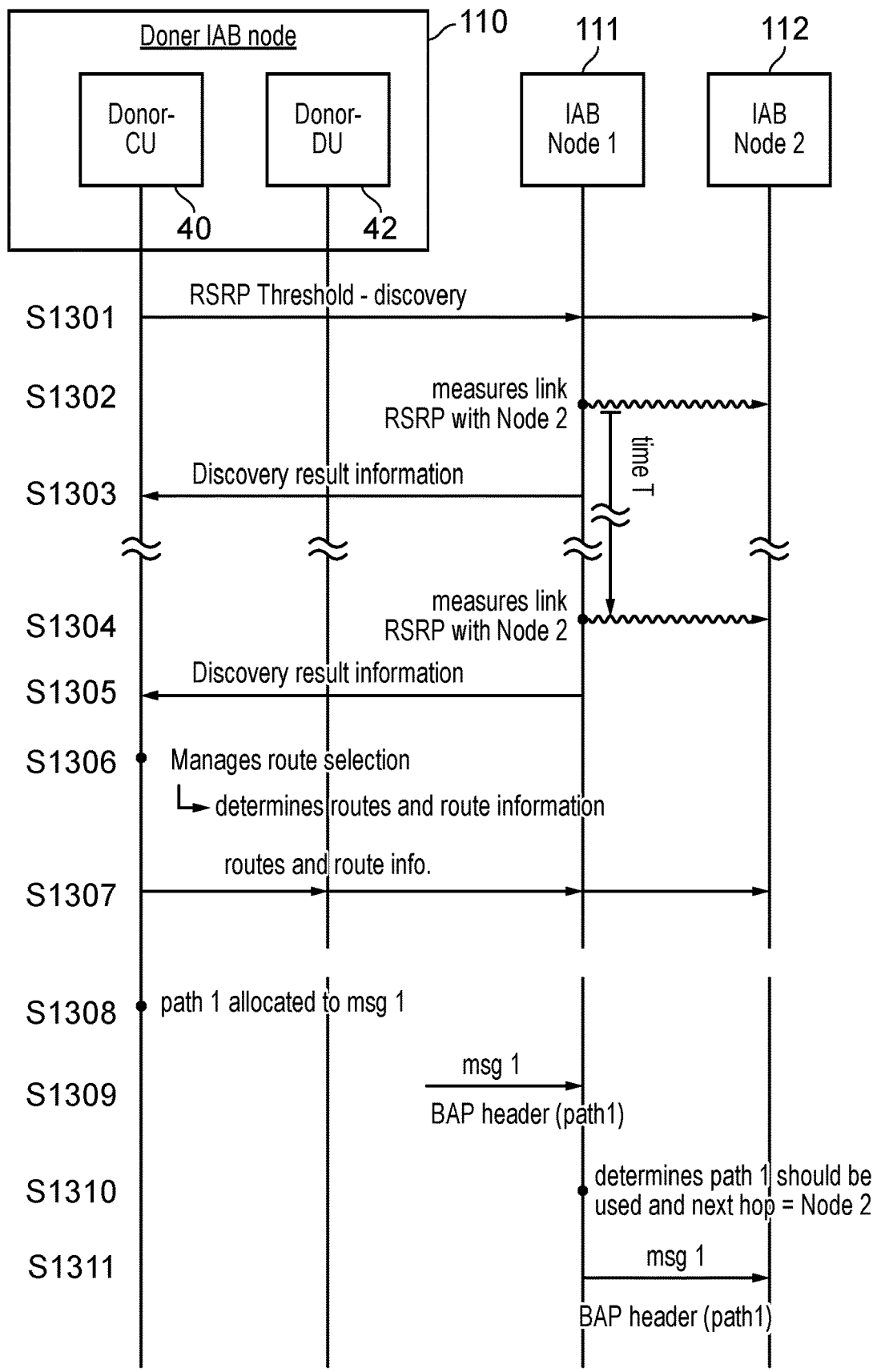
FIG. 13 illustrates an example route discovery and establishment procedure.

In this example, the CU will carry out the implementation of the mesh routing protocol and will receive and analyse the routing discovery message received from each IAB node. Based on these messages, the CU can make routing decision and can communicate these to the IAB nodes. FIG. 13 illustrates an example route discovery and establishment procedure.

At S1301, the Donor CU 40 can send discovery configuration to the IAB Nodes in its mesh network (or on of its mesh networks). In the interest of conciseness, the discussion of FIG. 13 is presented from the perspective of a single node (IAB Node1 111) and a single of its neighbours (Node 2 112) but the skilled person will appreciate that the mesh network might include more nodes and that each node might have one or more neighbours—and the same principles will apply equally to these situations.

At S1301 the CU 40 sends discovery information in the form of a Reference Signal Receive Power "RSRP" minimum threshold. This can define a minimum RSRP required for a neighbour to be considered as a suitable routing neighbour and, in this example, to be reported to the CU 40 of the Donor Node 110.

At S1302, Node 1 111 can make measurements for Node 2 112. Assuming Node 1 includes an MT element and Node 2 includes a DU element, the MT element of Node 1 can carry out signal measurements (e.g. conventional signal measurement for measuring signal from a base station or RRH—or otherwise defined measurements) for Node 2.

At S1303, Node 1 can send discovery result information to the CU 40, wherein the information will for example include a report on Node 2 if the RSRP for Node measured at S1302 was higher than the threshold received at S1301. This threshold can be used to filter whether to send RSRP discovery result to the CU 40 or not. The reporting can be sent for example using F1AP or RRC signalling, or any other suitable signalling between the IAB Node and the CU 40.

The CU 40 can also configure a timing for IAB Node 1 to carry out routing discovery. For example, a frequency or period of discovery result transmissions from each IAB node and/or a frequency or period of discovery measurements from each IAB node may be configured by the CU. In one example, a periodic timer based can be used. For example, in FIG. 13, after a time T has expired since the last measurement (and/or last report), IAB Node 1 111 can again carry out measurements (S1304) and report on the results to the CU 40 (S1305). Steps S1304-S1305 may be identical or similar to steps S1302 and S1303.

Additionally or alternatively, CU can request ad-hoc discovery reports and/or can send dedicated discovery result requirement to one or more specific IAB nodes. This can for example in a case where a possible route failure has been identified or where a new node has been detected, for example a node that is expected to be a neighbour of the one or more specific IAB nodes.

The CU 40 can then manage the route establishment within the mesh network at S1306, for example between the Donor Node 110 (or at least Donor DU 42) and the IAB Nodes in the mesh network. This route establishment is determined based on according to node discovery information received from nodes within at least the mesh network. Different routing criteria can be applied as appropriate. For example routes can be determined based on one or more of (i) a minimum or optimised number of hops criterion (e.g. to try to minimise number of hops in routes in the network), (ii) a minimum delay criterion (e.g. to try to minimise delay in transmissions and to select routes with faster transmissions), (iii) a reliability criterion (e.g. to try to minimise the number of failed, dropped or repeated transmissions and to use higher reliability routes), (iv) a throughput criterion (e.g. to select routes that will be expected to provide the highest throughput), etc.

The CU 40 can then distribute the route information to the donor DU and/or each IAB node at step S1307. In some cases, the same information will be sent to all nodes while in order cases the nodes will only receive routing information that is relevant to them. Also, information can be shared that identifies an entire or only part of a determined route within the mesh network. In one example, each IAB node only receives the next hop information associated with the route. The CU 40 can also send route information, e.g. one or more of criteria information on each route in order to differentiate among different routes, route identifiers (e.g. path numbers), etc.

FIG. 13 also illustrates how IAB Node 1 111 can process a message received through the mesh network. The Donor CU can determine which route to use for the message, for example based on the terminal(s) it is associated with, on the type of traffic it is associated with, any QoS or other transmission-related parameter associated with the message. In this example, a route "path1" is assigned to the message msg1 at S1308. It can then be associated or linked with the message so that the path can be recognised by the intermediate IAB nodes. In one example msg1 comprises a Backhaul Adaptation Protocol "BAP" header which includes a route identifier (e.g. with a value for path 1 in this example). Other type of associations may be used, for example using a different type of header or signalling to indicate which path is associated with the message.

Once Node 1 111 receives msg1 at S1309, it can determine at S1310 that the message is associated with path1. In this example and for illustrative purposes, it is assumed that path 1 has Node 2 as a next hop and it can send msg1 onwards to Node 2 1112 at S1311. Accordingly, the message can be propagated within the mesh network efficiently by trying to keep routing overhead as low as possible while having an arrangement that is expected to scale once the number of node and inter-node connections increase.

Example 1-2

OAM Controlled Route Discovery and Establishment

This example is similar to Example 1-1 but in this case an Operations, Administration and Maintenance "OAM" element of the network can control the routing scheme rather than the CU 40. Alternatively or additional, the scheme can also be controlled by any suitable application layer protocol element (e.g. TR-069) where route discovery and establishment can be controlled and applied.

Example 2

Distributed Route Discovery and Establishment Between IAB Node and Donor DU

In this example any suitable routing protocol may be adopted within the mesh network, so long as the IAB nodes within the mesh network adopt the same routing protocol.

Figure 14:
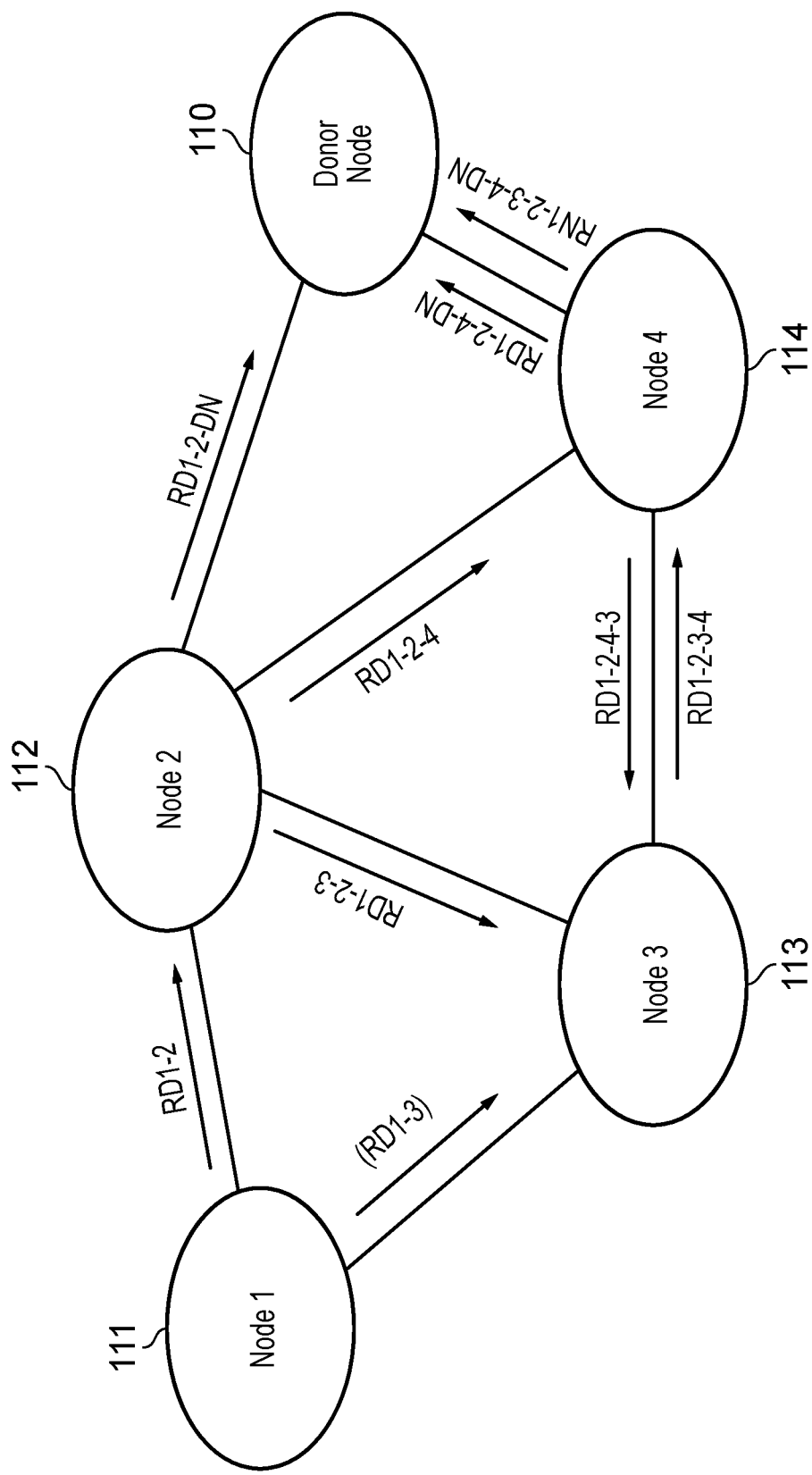
FIG. 14 illustrates a further example route discovery and establishment procedure.

FIG. 14 illustrates how this example can be used in an example mesh network comprising a Donor Node 110 and four IAB Nodes Node1-Node4 111-114. The discussion of FIG. 14 is from the perspective of Node1 111 but it will be appreciated that the same teachings and techniques can be used in respect of any other node.

Node1 can send a route discovery message to its neighbours so that a route can be established when it finally reaches the IAB donor node. The route discovery message can for example (at least at first) include an indication of the source, Node1 in this case, and of the desired destination, Donor Node in this case. For example, Node1 sends route discovery messages RD1-2 to Node 2 and RD1-3 to Node3. The route discovery message can be transmitted via RRC signalling (e.g. on the Uu interface), IAB node sidelink. The IAB sidelink interface represents any interface through which the IAB nodes can communicate with each other for the management of the IAB layer or service. For example, the IAB sidelink could be provided on a PC5 interface and/or another type of air interface. In one example, an Adaptation Layer (see [4] for example) or another layer used to configure or use an IAB capability can be provided over this sidelink interface between two IAB nodes.

In the interest of conciseness and legibility of FIG. 14, the remainder of the discussion will focus on the propagation of message RD1-2. However, the skilled person will appreciate that the teachings and techniques can be applied to message RD1-3.

Once RD1-2 has reached Node 2, Node will propagate RD1-2 to its neighbours. For example, it will propagate the message to Nodes 3 and 4 and to the Donor Node and send messages RD1-2-3, RD1-2-4 and RD1-2-DN, respectively. While Node 2 can in some cases send a message to Node 1 as well, in order to avoid loops in the identified routes and in the propagation of the route discovery messages, Node 2 may detect that the message has already been through Node 1 and may then decide not to propagate the route discovery message back to Node 1. FIG. 14 illustrates this optional loop detection mechanism being used, although this is an optional feature. In other cases, a node receiving a route discovery message will send the message to all neighbour and a loop detection mechanism may be used at the node receiving the route discover message (e.g. Node 1 may detect that RD1-2-1 includes a loop and ignore the message).

Next, message RD1-2-DN has identified a route to the donor node and will thus not be forwarded onto the Donor Node's neighbours. As messages RD1-2-3 and RD1-2-4 have not yet reached the Donor Node, the receiving Node will propagate the message to its neighbours. Using the loop detection mechanism discussed above, this will lead to the transmission of RD1-2-3-4 from Node 3 and of both RD1-2-4-3 and RD1-2-4-DN from Node 4.

Then, Node 3 can then ignore RD1-2-4-3: Node 3's neighbours, namely nodes 1, 2 and 4, are all identified in the route discovery message and have thus already been a part of the chain identified in the route discovery message. Node 4 however can still send RD1-2-3-4 to the Donor Node as RD1-2-3-4-DN.

Accordingly, all routes from Node 1 to the Donor Node via Node 2 have been identified in this example, namely 1-2-DN, 1-2-3-4-DN and 1-2-4-DN.

As discussed above, the same techniques can be used in respect of message RD1-3, which would lead to the discovery of routes 1-3-2-DN, 1-3-2-4-DN, 1-3-4-DN and 1-3-4-2-DN.

In other words, the route discovery message is propagated through the IAB Nodes and updated as it progresses or is forwarded through the IAB Nodes until it reaches the donor node. This is done preferably with a loop detection mechanism which the skilled person will be able to select and implement as deemed appropriate in a particular situation.

Once a route has been identified, the route can be notified to at least the node at the source of the route discover message (Node 1 in the example illustrated in FIG. 14) and optionally to the intermediate nodes in the path.

In a first example, once a route discovery message reaches the Donor Node, a message indicating that a route has been discovered can be sent back through the same route. For example, once RD1-2-4-DN has been received at the Donor Node, the Donor Node can send a route discovered message to Node 4 to notify Node 4 of the route and for Node 4 to send the same or a modified route discovered message to Node 2 and so on. Then each of Nodes 1, 2 and 4 are aware that there is a path from Node 1 to the Donor Node via Node 2 then 4 (and the other way around, from the Donor Node to Node 1 via Node 4 then 2).

In a second example, the Donor Node can notify one or mode Node with a single message including route information. For example, it may include a routing table including at least the discovered routes (e.g. 1-2-DN, 1-2-3-4-DN, 1-2-4-DN, 1-3-2-DN, 1-3-2-4-DN, 1-3-4-DN and 1-3-4-2-DN in the example IAB mesh network of FIG. 14) in the route discovered message. In some cases, the message may include additional information, e.g. information regarding the removal and/or update of any route previously discovered, a route identified for the discovered route(s) and/or any attribute for the discovered route(s). Such attributes may for example be used as route selection parameters (as discussed above).

It is also noted that the Donor Node may be configured to analyse the discovered routes and determine if any route should be included in any route discovered message that night be sent. For example, if the Donor Node determines that route 1-2-3-4-DN should not be included, the Donor Node will not send a route discovered message including this route. In other words, only the selected discovered routes will be identified in the one or more (e.g. depending on the technique used and/or number of routes selected) messages sent by the Donor Node.

It is also pointed out that the route discovery process may rely on a different procedure, and may not always include a full propagation of the route discovery messages. For example, if we take the IAB mesh network of FIG. 14 and assume that Nodes 2-4 and the Donor Node are already configured and already aware of the routes to the Donor Node, then Node 1 can discover the routes available from its neighbours. For example, Node 1 can be notified by Node 2 that Node 2 is connected to the Donor Node via routes 2-DN, 2-4-DN and 2-3-4-DN. Accordingly, Node knows that routes 1-2-DN, 1-2-4-DN and 1-2-3-4-DN lead to the Donor Node. The same principle may be applied to the routes available from Node 3, the other neighbour of Node 1.

In some cases, further communication may be involved to determine if the addition of an IAB Node creates new paths from other IAB Nodes to the Donor Node. For instance, a new Node can notify a neighbouring node of any routes from the new Node to the Donor Node which do not involve the neighbouring Node. In the example above, this would lead to Node 1 notifying Node 2 of any routes it has discovered which do not include Node 2. Node 1 can for example transmit to Node 2 a message identifying that at least route 1-3-4-ND is available through Node 1. Accordingly, Node 2 can then determine that it has a new route to the Donor Node, namely 2-1-3-4-DN, which was not previously available.

As in another example of the discovery message, the route discovered message or route discovered information identifying route that have been discovered can be included in system information, e.g. in a specific System Information Block (SIB), which may be broadcasted.

In such a distributed arrangement, both proactive, reactive or hybrid route discovery can be implemented. With a proactive protocol, the discovery process can be carried out regularly and/or automatically. Nodes can automatically inform each other of route or path changes. Such a scheme provides an increased resilient and recovery capabilities, e.g. after a link failure. Proactive protocols are expected to perform better in static scenarios, in which the network paths rarely or never change. Accordingly, the increased overhead caused by the messages sent anytime there is a change in routes. Reactive schemes or protocols can instead establish routes on demand without any prior knowledge of routes. When a new connection has to be set up or a new route has to be selected for transmitting a message or traffic, a node might have to enquire about the entire network to search for the correct path. As a result, reactive networks scale better, but it can take more time to establish connections as paths may not be known beforehand. Hybrid protocols or schemes inherits characteristics from proactive and reactive protocols and are often used for more specific cases where the drawbacks or limitations associated with the proactive and reactive are very pronounced or undesirable. Hybrid protocols can adjust to the conditions where either technique is favourable.

Returning to this second example, the CU (or any other suitable element which can operating as a routing control unit) can still control the configuration of route establishment or route update as discussed in respect of other examples. For example, it can configure the IAB nodes to determine when to search for new routes (e.g. by defining when to send discovery message and/or when there is data available to be transmitted but without an effective route or without a route that is deemed satisfactory), the threshold to send routing discovery message to its neighbours (e.g. such that in some cases only the neighbours with certain minimum RSRP threshold will receive the routing discovery message to be propagated), route update periodicity etc.

With this option, each node can maintain at least a route to IAB donor node and vice versa. In some example, related route information such as number of hops, delay, link quality, throughput, etc. will be included in the route table as well. Different routing establishment criteria can be applied. In some example, information relating to different route selection criteria can be carried in the route discovery message(s). These may include for example one or more of hop number, delay, RSRP, etc.

In this arrangement, two or more routes can sometimes be identified between a Node and the destination IAB Node (e.g. Donor Node or End Node). For example, when considering the same two source and destination IAB Nodes, a first route may be used for an Enhanced Mobile Broadband "eMBB" service and a second different route may be used for an Ultra-reliable low-latency communication "URLLC" service as these two services will have different priorities and different expectations for the routes.

It should be noted that this example of using two different routes depending on the type of traffic to be transmitted is not limited to this example and is also applicable to other example implementations.

The skilled person will also appreciate that this example can also be used on a case where there is a desire to establish a route between two IAB nodes (which are not donor nodes). The route discovery procedure can also be applied in this case, without the active involvement of the CU when propagating the route discovery messages and identifying one or more routes between the two nodes.

Example 3

Hybrid CU Controlled and Distributed Route Discovery and Establishment

In this example, each IAB node can send and propagate route discovery messages and establish at least one route to the donor node as explained in Example 2. In this example, the IAB node will submit any route identified as a candidate route to the CU. Once the CU is aware of any candidate route, it can make a selection of which route(s) should be used between the CU and IAB node and can inform the IAB node accordingly.

In accordance with the present disclosure, the transmission of a candidate route from an IAB node to the donor CU and/or donor node could be triggered by:

1) New route discovery
2) Route failure. For example, a link between a next or previous hope on the route is detected as having failed or if a route failure is detected or being notified in any other way.
3) Periodic route update, e.g. based on a configuration that can be transmitted to the IAB nodes.
4) New route requirement according to service requirement. If for example a new service is expected to be used in the mesh network or if a service will no longer be used, routing updating might be appropriate to identify one or more routes for the service(s) expected to be used in the mesh network.
5) New RLC channel configuration. It can be appropriate to process traffic differently according to a configuration of an RLC channel.
6) IAB node movement. Mobility parameters for an IAB node, relative mobility parameters between two IAB nodes, position of an IAB node, relative position of two IAB nodes are some of the mobility parameters that can be taken into account when As the skilled person will appreciate, not only Example 2 can be used when identifying a route between two IAB nodes. Any of the other examples or techniques discussed herein can also be adapted and implemented in the same way so as to reach another IAB node which differs from the Donor Node. For example, when looking at the example of FIG. 4, Node 1 may be able to determine which path(s) may be available to reach Node 2 using the techniques discussed herein. Node 1 can then determine that it can use at least paths 1-2, 1-3-2 and 1-3-4-2 to reach Node 2—possibly also 1-3-4-DN-2 if this path is allowed.

As discussed above, according to the present disclosure routes can be identified based on network discovery information and can then be selected for transmitting traffic within the mesh network.

In some examples, the IAB donor, the CU or another routing control unit can decide which route should be selected for each packet, terminal and/or type of traffic. This selection can be based on selection rules which can include route characteristics, service requirement, user subscription, etc. A corresponding route (e.g.) path ID can then be associated with the packet, terminal and/or type of traffic accordingly. As discussed above in respect of FIG. 13, in some cases it can be included in a BAP or other header to indicate the route selected for the packet (e.g. as already supported in Rel-16 IAB). Accordingly, two packets going through a node and directed to a terminal or to the donor node may be directed to a different next hop if the packets are associated with different routes. In some cases, the routes might be identical or might partially overlap such that the next hope will be the same.

As also mentioned above, in some cases the route selection will be carried out at least partially at the IAB node level. For example, for each packet or message, the IAB node will identify which route to use (i.e. it may not use the same route for all traffic). In some case, the IAB node will simply send the packet to the next hop. In other cases, the IAB node can identify (e.g. in a header of the packet) which route it is using. The next hop can then use the same route when transmitting the packet or message onwards. In some cases, the next hop or another next hop on the route might modify or change the route according to its local information. For example, a note along the route might update the route or routing information based on minimum number of hops criterion if the next IAB node find a route with fewer hops compared with the original route as identified in the packet received by the next IAB node.

In accordance with the present disclosure, route detection and identification can be carried in a manner that is well suited to mesh IAB networks.

As mentioned above, the techniques discussed herein are expected to be mostly used once the IAB node is already connected to the network (see "Phase 1" above such that the use of the term discovery in the context of the present disclosure is in the context of determining which routes may be available. It may for example differ from discovery when trying to detect whether an IAB node (or other element) can be detected. For example, it is conceivable to have a situation where an IAB node (e.g. Node 1) can detect the presence of another IAB node (e.g. Node 2), and where the link between Nodes 1 and 2 is such that Node 2 will not be detected, discovered or identified as a neighbour to Node 1 for the routing purposes.

Those skilled in the art would appreciate that the method shown by FIG. 12 may be adapted in accordance with the techniques of the present disclosure. For example, other intermediate steps may be included in the method and/or the steps may be performed in any logical order. They may for example be carried out in a different order and/or partially or fully in parallel whenever appropriate.

Although examples have been given with particular node configurations, it would be clear to those skilled in the art that these configurations are merely illustrative. The techniques and teachings provided in respect of these configurations could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

The following numbered Examples provide further example aspects, techniques, teachings and/or features of the present disclosure:

Example 1. A method for determining a route in an Integrated Access Backhaul "IAB" mesh zone in a mobile telecommunications network comprising a terminal, the IAB mesh zone comprising a centralised unit and a plurality of IAB nodes, the route being for transmitting a packet through a path comprising at least two of the plurality of IAB nodes, the method comprising:
  transmitting, by a routing control unit and to each IAB node of the plurality of IAB nodes, one or more discovery parameters for the each IAB node to determine whether another IAB node of the plurality of IAB nodes is discoverable;
  determining, by the routing control unit, one or more route selection parameters for the each IAB node to select a route;
  a first IAB node of the plurality of IAB nodes determining, based on the one or more discovery parameters, that a second IAB node of the plurality of IAB nodes is discoverable; and
  upon receiving a packet, selecting a route from the first IAB node based on the one or more route selection parameters and on the first IAB node determining that the second IAB node is discoverable.

Example 2. The method of Example 1, wherein the route selection parameters comprise one or more of: routing table, a route identifier, a threshold for selecting a route, a quality or priority parameter for selecting a route, a number of hops criterion, a delay criterion, a reliability criterion and a throughput criterion.

Example 3. The method of Example 1 or 2 further comprising transmitting, by the routing control unit, routing information, wherein the routing information comprises one or more of: a routing protocol, a routing table format, a number of hops criterion, a delay criterion, a reliability criterion and a throughput criterion.

Example 4. The method of any preceding Example, wherein the one or more discovery parameters comprise one or more of a minimum signal strength, a minimum signal power, a minimum link quality, an estimated relative distance, a mobility parameter, an interference level, a timing parameter indicating when to determine whether another IAB node of the plurality of IAB nodes is discoverable.

Example 5. The method of any preceding Example wherein the selected route comprises the second IAB node.

Example 6. The method of any preceding Example further comprising transmitting the packet from the first IAB node in accordance with the selected route.

Example 7. The method of any preceding Example wherein determining the one or more route selection parameters for the each IAB node to select a route comprises the routing control unit selecting a first route for routing a packet; the method comprising associating the packet with the first route.

Example 8. The method of Example 7 wherein the route selection parameter comprises an identifier for the first route and wherein the route selection parameter is included in a header of the packet, thereby associating the packet with the first route.

Example 9. The method of any preceding Example, the method comprising the first IAB node, based on the determination that the second IAB node is discoverable:
  transmitting a route discovery message originating from the first IAB node to the second IAB node; and
  transmitting a route discovery message originating from a further IAB node of the plurality of IAB nodes to the second IAB node.

Example 10. The method of Example 9 wherein the first IAB node includes an identifier for the first IAB node to the route discovery message before transmitting the route discover message to the second IAB node.

Example 11. The method of any preceding Example, the method comprising the first IAB node, based on the determination that the second IAB node is discoverable and upon receipt of a route discovery message originating from a further IAB node to the first IAB node, wherein the route discovery message identifies a path including the further IAB node:
  transmitting a further route discovery message to the second IAB node, wherein the further route discovery message identifies an updated path including both the further IAB node and the first IAB node, the first IAB node being a subsequent node to the further IAB node in the updated path.

Example 12. The method of any preceding Example, the method comprising the first IAB node, based on the determination that the second IAB node is discoverable:
  receiving from the second IAB node a connection available message, the connection available message identifying at least a first route from the second IAB node to another IAB node of the plurality of IAB nodes;
  upon receipt of the connection available message, the first IAB node identifying a second route from the first IAB node to the another IAB node through the second IAB node, the second route comprising the first route.

Example 13. The method of any preceding Example, wherein the routing control unit identifies a plurality of routes to the first IAB node and wherein the first IAB node can select the route from the plurality of routes.

Example 14. The method of any preceding Example wherein the routing control unit is comprised in one or more of a centralised unit, a donor node of the plurality of IAB nodes, an Operations, Administration and Maintenance element and a standalone routing control element.

Example 15. The method of any preceding Example wherein the first IAB node includes one or more of a Distributed Unit "DU" element, a Transmission and Reception Point "TRP", an antenna system, a remote radio head "RRH" and a Mobile Terminal "MT" element.

Example 16. The method of any preceding Example wherein the second IAB node includes one or more of a Distributed Unit "DU" element, a Transmission and Reception Point "TRP", an antenna system, a remote radio head "RRH" and a Mobile Terminal "MT" element.

Example 17. The method of any preceding Example, wherein the packet is associated with the terminal.

Example 18. The method of any preceding Example, wherein the plurality of IAB nodes comprises a Donor Node associated with the centralised unit and wherein the route for transmitting the packet is through a path comprising the Donor Node Example 19. A system for determining a route in an Integrated Access Backhaul "IAB" mesh zone in a mobile telecommunications network comprising a terminal, the system comprising the IAB mesh zone wherein the IAB mesh zone comprises a centralised unit and a plurality of IAB nodes, the route being for transmitting a packet through a path comprising at least two of the plurality of IAB nodes, the system comprising:

A routing control unit configured to
transmit to each IAB node of the plurality of IAB nodes, one or more discovery parameters for the each IAB node to determine whether another IAB node of the plurality of IAB nodes is discoverable;
determine one or more route selection parameters for the each IAB node to select a route;
a first IAB node of the plurality of IAB nodes, the first IAB node being configured to determine, based on the one or more discovery parameters, that a second IAB node of the plurality of IAB nodes is discoverable; and
to select, upon receiving a packet, a route from the first IAB node and based on the one or more route selection parameters and based on the first IAB node determining that the second IAB node is discoverable.

Example 20. A system for determining a route in an Integrated Access Backhaul "IAB" mesh zone in a mobile telecommunications network comprising a terminal, the system comprising the IAB mesh zone wherein the IAB mesh zone comprises a centralised unit and a plurality of IAB nodes, the route being for transmitting a packet through a path comprising at least two of the plurality of IAB nodes, the system being configured to implement the method of any one of Examples 1 to 18.

Example 21. An Integrated Access Backhaul "IAB" Node for use in a mobile telecommunications network, wherein the mobile telecommunications network comprises an IAB mesh zone comprising a centralised unit, the IAB Node and one or more further IAB Nodes, wherein the IAB Node is configured to:
receive one or more discovery parameters for determining whether a second IAB node is discoverable, the second IAB node being one of the one or more further IAB Nodes;
determine, based on the one or more discovery parameters, that the second IAB node is discoverable;
receive, one or more route selection parameters for selecting a route; and
select, upon receipt of a packet, a route from the IAB Node based on the one or more route selection parameters and on the IAB Node determining that the second IAB node is discoverable, thereby determining a route for transmitting the packet through a path comprising the second IAB node.

Example 22. An Integrated Access Backhaul "IAB" Node for use in a mobile telecommunications network, wherein the IAB Node is configured to implement the features of the first IAB node in the method of any one of Examples 1 to 18.

Example 23. Circuitry for Integrated Access Backhaul "IAB" Node for use in a mobile telecommunications network, wherein the mobile telecommunications network comprises an IAB mesh zone comprising a centralised unit, the IAB Node and one or more further IAB Nodes, the circuitry comprising:
transmitter circuitry configured to transmit signals via a wireless access interface of the IAB Node,
receiver circuitry configured to wireless receive signals, and
controller circuitry configured to:
control the transmitter and the receiver to:
receive one or more discovery parameters for determining whether a second IAB node is discoverable, the second IAB node being one of the one or more further IAB Nodes; and
receive, one or more route selection parameters for selecting a route;
determine, based on the one or more discovery parameters, that the second IAB node is discoverable;
select, upon receipt of a packet, a route from the IAB Node based on the one or more route selection parameters and on the IAB Node determining that the second IAB node is discoverable, thereby determining a route for transmitting the packet through a path comprising the second IAB node.

Example 24. A method of controlling an Integrated Access Backhaul "IAB" Node for use in a mobile telecommunications network, wherein the mobile telecommunications network comprises an IAB mesh zone comprising a centralised unit, the IAB Node and one or more further IAB Nodes, the method comprising:
receiving one or more discovery parameters for determining whether a second IAB node is discoverable, the second IAB node being one of the one or more further IAB Nodes;
determining, based on the one or more discovery parameters, that the second IAB node is discoverable;
receiving, one or more route selection parameters for selecting a route; and
selecting, upon receipt of a packet, a route from the IAB Node based on the one or more route selection parameters and on the IAB Node determining that the second IAB node is discoverable, thereby determining a route for transmitting the packet through a path comprising the second IAB node.

Example 25. A computer program comprising instructions which, when executed, cause the implementation of the method of any one of Examples 1-18 and 24.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-161901, "Revised work item proposal: Enhancements of NB-IoT", Huawei, HiSilicon, 3GPP TSG RAN Meeting #73, New Orleans, USA, Sep. 19-22, 2016.

[3] RP-170831, "New SID Proposal: Study on Integrated Access and Backhaul for NR", AT&T, 3GPP RAN Meeting #75, Dubrovnik, Croatia, March 2017.

[4] 3GPP TTR 38.874 "$3^{rd}$ Generation Partnership Project; Technical Specification Group Radio Access Network; Study on Integrated Access and Backhaul; (Release 16)", $3^{rd}$ Generation Partnership Project (V16.0.0, 2018 December).

[5] R2-1801606, "Proposals on IAB Architecture", Qualcomm et al, 3GPP TSG-RAN WG2 NR Ad hoc 1801, Vancouver, Canada, Jan. 22-26, 2018.

[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.

The invention claimed is:

1. A method for determining a route in an Integrated Access Backhaul (IAB) mesh zone in a mobile telecommunications network comprising a terminal, the IAB mesh zone comprising a centralised unit and a plurality of IAB nodes, the route being for transmitting a packet through a path comprising at least two of the plurality of IAB nodes, the method comprising:
  transmitting, by circuitry of a routing control unit and to each IAB node of the plurality of IAB nodes, one or more discovery parameters for the each IAB node to determine whether another IAB node of the plurality of IAB nodes is discoverable;
  determining, by the circuitry of the routing control unit, one or more route selection parameters for the each IAB node to select a route;
  a first IAB node of the plurality of IAB nodes determining, based on the one or more discovery parameters, that a second IAB node of the plurality of IAB nodes is discoverable; and
  upon receiving a packet, selecting a route from the first IAB node based on the one or more route selection parameters and on the first IAB node determining that the second IAB node is discoverable,
  wherein determining the one or more route selection parameters for the each IAB node to select a route comprises the circuitry of the routing control unit selecting a first route for routing a packet, and the method further comprises associating the packet with the first route, and
  the one or more route selection parameters comprise an identifier for the first route and the one or more route selection parameters are included in a header of the packet, thereby associating the packet with the first route.

2. The method of claim 1, wherein the route selection parameters comprise one or more of:
  a routing table, a route identifier, a threshold for selecting a route, a quality or priority parameter for selecting a route, a number of hops criterion, a delay criterion, a reliability criterion and a throughput criterion.

3. The method of claim 1 further comprising transmitting, by the circuitry of the routing control unit, routing information, the routing information comprising one or more of:
  a routing protocol, a routing table format, a number of hops criterion, a delay criterion, a reliability criterion and a throughput criterion.

4. The method of claim 1, wherein the one or more discovery parameters comprise one or more of:
  a minimum signal strength, a minimum signal power, a minimum link quality, an estimated relative distance, a mobility parameter, an interference level, a timing parameter indicating when to determine whether another IAB node of the plurality of IAB nodes is discoverable.

5. The method of claim 1 wherein the selected route comprises the second IAB node.

6. The method of claim 1 further comprising transmitting the packet from the first IAB node in accordance with the selected route.

7. The method of claim 1, the method comprising the first IAB node, based on the determination that the second IAB node is discoverable:
  transmitting a route discovery message originating from the first IAB node to the second IAB node; and
  transmitting a route discovery message originating from a further IAB node of the plurality of IAB nodes to the second IAB node.

8. The method of claim 7 wherein the first IAB node includes an identifier for the first IAB node to the route discovery message before transmitting the route discover message to the second IAB node.

9. The method of claim 1, the method comprising the first IAB node, based on the determination that the second IAB node is discoverable and upon receipt of a route discovery message originating from a further IAB node to the first IAB node, wherein the route discovery message identifies a path including the further IAB node:
  transmitting a further route discovery message to the second IAB node, wherein the further route discovery message identifies an updated path including both the further IAB node and the first IAB node, the first IAB node being a subsequent node to the further IAB node in the updated path.

10. The method of claim 1, the method comprising the first IAB node, based on the determination that the second IAB node is discoverable;
  receiving from the second IAB node a connection available message, the connection available message identifying at least a first route from the second IAB node to another IAB node of the plurality of IAB nodes;
  upon receipt of the connection available message, the first IAB node identifying a second route from the first IAB node to the another IAB node through the second IAB node, the second route comprising the first route.

11. The method of claim 1, wherein the routing control unit identifies a plurality of routes to the first IAB node and wherein the first IAB node can select the route from the plurality of routes.

12. The method of claim 1 wherein the routing control unit is comprised in one or more of a centralised unit, a donor node of the plurality of IAB nodes, an Operations, Administration and Maintenance element and a standalone routing control element.

13. The method of claim 1 wherein the first IAB node includes one or more of a Distributed Unit (DU) element, a Transmission and Reception Point (TRP), an antenna system, a remote radio head (RRH) and a Mobile Terminal (MT) element.

14. The method of claim 1 wherein the second IAB node includes one or more of a Distributed Unit (DU) element, a Transmission and Reception Point (TRP), an antenna system, a remote radio head (RRH) and a Mobile Terminal (MT) element.

15. The method of claim 1, wherein the packet is associated with the terminal.

16. The method of claim 1, wherein the plurality of IAB nodes comprises a Donor Node associated with the centralised unit and wherein the route for transmitting the packet is through a path comprising the Donor Node.

17. An Integrated Access Backhaul (IAB) Node for use in a mobile telecommunications network, wherein the mobile telecommunications network comprises an IAB mesh zone comprising a centralised unit, the IAB Node and one or more further IAB Nodes, wherein the IAB Node is configured to:
receive one or more discovery parameters for determining whether a second IAB node is discoverable, the second LAB node being one of the one or more further IAB Nodes;
determine, based on the one or more discovery parameters, that the second IAB node is discoverable;
receive, one or more route selection parameters for selecting a route; and
select, upon receipt of a packet, a route from the IAB Node based on the one or more route selection parameters and on the IAB Node determining that the second IAB node is discoverable, thereby determining a route for transmitting the packet through a path comprising the second IAB node,
wherein the one or more route selection parameters are determined by selecting a first route for routing a packet, and associating the packet with the first route, and
the one or more route selection parameters comprise an identifier for the first route and the one or more route selection parameter are included in a header of the packet, thereby associating the packet with the first route.

18. A method of controlling an Integrated Access Backhaul (IAB) Node for use in a mobile telecommunications network, wherein the mobile telecommunications network comprises an IAB mesh zone comprising a centralised unit, the IAB Node and one or more further IAB Nodes, the method comprising:
receiving one or more discovery parameters for determining whether a second IAB node is discoverable, the second IAB node being one of the one or more further IAB Nodes;
determining, based on the one or more discovery parameters, that the second IAB node is discoverable;
receiving, one or more route selection parameters for selecting a route; and
selecting, upon receipt of a packet, a route from the IAB Node based on the one or more route selection parameters and on the LAB Node determining that the second IAB node is discoverable, thereby determining a route for transmitting the packet through a path comprising the second IAB node,
wherein the one or more route selection parameters are determined by selecting a first route for routing a packet, and associating the packet with the first route, and
the one or more route selection parameters comprise an identifier for the first route and the one or more route selection parameter are included in a header of the packet, thereby associating the packet with the first route.

* * * * *